United States Patent
Groysman et al.

(10) Patent No.: US 12,256,114 B2
(45) Date of Patent: Mar. 18, 2025

(54) METHOD AND APPARATUS FOR PROVIDING PROGRAMMATIC GUARANTEED CONTENT INSERTION FOR SUPPORTING DELIVERY USING QUADRATURE AMPLITUDE MODULATION AND/OR OTHER DELIVERY TECHNIQUES

(71) Applicant: Charter Communications Operating, LLC, St. Louis, MO (US)

(72) Inventors: Alexander Groysman, Passaic, NJ (US); Marc Forman, Princeton Junction, NJ (US)

(73) Assignee: Charter Communications Operating, LLC, St. Louis, MO (US)

( * ) Notice: Subject to any disclaimer, the term of this patent is extended or adjusted under 35 U.S.C. 154(b) by 68 days.

(21) Appl. No.: 18/129,042

(22) Filed: Mar. 30, 2023

(65) Prior Publication Data
US 2024/0333988 A1    Oct. 3, 2024

(51) Int. Cl.
*H04N 21/23* (2011.01)
*H04N 21/2385* (2011.01)
*H04N 21/81* (2011.01)

(52) U.S. Cl.
CPC ....... *H04N 21/2385* (2013.01); *H04N 21/812* (2013.01)

(58) Field of Classification Search
CPC .......... H04N 21/2385; H04N 21/812
See application file for complete search history.

(56) References Cited

U.S. PATENT DOCUMENTS

| | | | | |
|---|---|---|---|---|
| 9,449,109 | B1* | 9/2016 | Keel | G06F 16/9537 |
| 9,699,502 | B1* | 7/2017 | Sandholm | H04N 21/482 |
| 10,757,462 | B2* | 8/2020 | Lykes | H04N 21/2668 |
| 2005/0289630 | A1* | 12/2005 | Andrews | H04N 21/6175 725/147 |
| 2007/0288953 | A1* | 12/2007 | Sheeman | G06Q 30/08 725/34 |
| 2008/0046924 | A1* | 2/2008 | Hood | H04N 7/17318 348/E7.071 |
| 2008/0228564 | A1* | 9/2008 | de Heer | H04N 21/478 705/14.71 |

(Continued)

*Primary Examiner* — Timothy R Newlin
(74) *Attorney, Agent, or Firm* — Straub & Straub; Michael P. Straub; Stephen T. Straub

(57) ABSTRACT

A single piece of content, e.g., a creative, is delivered to multiple devices through a QAM or multicast communications technique, with each receiving device corresponding to an impression opportunity in some cases. Bidders are provided the opportunity to bid on an individual single impression opportunity basis even when the impression corresponds to a multicast or QAM content delivery method and thus multiple impressions. Because impression opportunity offers and bids are for single impressions the bidder systems need not deal with the technical complexities of multipliers when receiving, considering and placing bids. DSPs are normally used to place bids on single Internet delivered impressions can bid on impression opportunities corresponding to QAM or multicast delivered program content with the system being used to determine the winner of bids handling the complexity of tracking of multiple individual bid wins and eventually determining the winner of an N opportunity deal.

20 Claims, 13 Drawing Sheets

(56) References Cited

U.S. PATENT DOCUMENTS

| | | | |
|---|---|---|---|
| 2010/0138290 A1* | 6/2010 | Zschocke | H04N 21/812 |
| | | | 705/14.46 |
| 2013/0055309 A1* | 2/2013 | Dittus | G06Q 30/0269 |
| | | | 725/35 |
| 2013/0191210 A1* | 7/2013 | Moore | H04N 21/6125 |
| | | | 705/14.48 |
| 2014/0101694 A1* | 4/2014 | Canney | H04N 21/2547 |
| | | | 725/34 |
| 2015/0066662 A1* | 3/2015 | Knapp | G06Q 30/02 |
| | | | 705/14.71 |
| 2015/0195593 A1* | 7/2015 | Hoyne | G06Q 30/02 |
| | | | 725/19 |
| 2017/0208370 A1* | 7/2017 | Ray | H04N 21/266 |
| 2017/0374502 A1* | 12/2017 | Gabel | G06Q 50/26 |
| 2018/0365034 A1* | 12/2018 | Becotte, IV | G06F 16/972 |

* cited by examiner

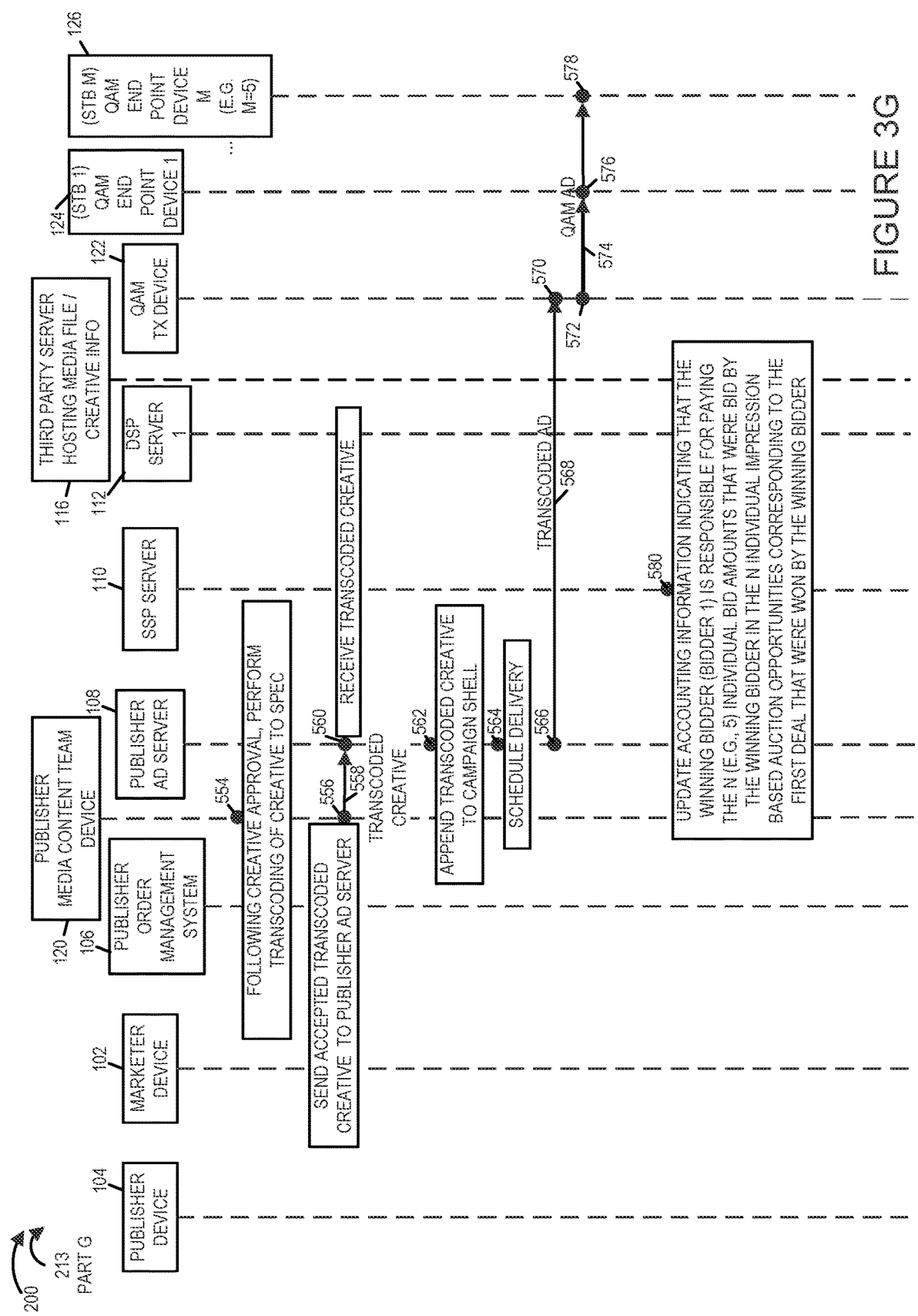

| FIGURE 3A |
|---|
| FIGURE 3B |
| FIGURE 3C |
| FIGURE 3D |
| FIGURE 3E |
| FIGURE 3F |
| FIGURE 3G |

FIGURE 3

METHOD AND APPARATUS FOR PROVIDING PROGRAMMATIC GUARANTEED CONTENT INSERTION FOR SUPPORTING DELIVERY USING QUADRATURE AMPLITUDE MODULATION AND/OR OTHER DELIVERY TECHNIQUES

FIELD

The present invention relates to content delivery and, more particularly, to methods and apparatus for arranging for the delivery of content, e.g., a creative, corresponding to presentation opportunities as part of an arranged deal including multiple presentation opportunities, e.g., with presentation opportunities being auctioned to potential bidders who can use the presentation opportunity to display bidder supplied content communicated to devices, e.g., via Quadrature Amplitude Modulation (QAM).

BACKGROUND

Auctions are often used for determining which advertiser's content will be presented by a device, e.g., to a viewer, during a presentation opportunity, e.g., also sometimes referred to as an impression opportunity. While impression opportunities may come up during an Internet session e.g., when a user is browsing the Internet and accessing other content, impression opportunities may also come up in the context of linear program content, e.g., quadrature amplitude modulated (QAM) communicated TV or other program content supplied via a communications system such as a cable network system.

A bid for an impression opportunity may be placed by a bidder through a platform which is sometimes referred to as a demand side platform (DSP). Auctions for single impressions are easy to bid on and track with the corresponding creative, e.g., advertisement supplied or identified by the winning bidder, being displayed or scheduled for delivery as soon as the auction on the individual impression opportunity is won by a bidder even if the impression or bid corresponds to a deal which may involve more than one impression.

DSP users find auctions for single impression opportunities easy to work with and bid on with bidders often preferring to be able to bid on single impression opportunities even though a large number of bids may be required as part of a communications campaign. The preference for single impression bidding is in large part technical in that the units involved in the bid are fixed and predictable with each bid amount corresponding to a single impression opportunity.

While it is possible to allow multiple bids for an impression, given the communications and messaging involved along with the risk for bid errors when designing a communications campaign, where the number of impressions to which a bid corresponds can vary from bid opportunity to bid opportunity, bidders will often decline or be reluctant to participate in auctions where the bidding units are for some multiple of an impression opportunity. This is largely because of the technical problem with having to communicate and/or translate between a cost for an impression opportunity that a bidder might select for a single impression to some multiple which takes into consideration the number of impression opportunities being presented in a multi-impression offer upon which a bid may be placed. Also, the communications of bids and bid answers is complicated in that a different multiple of impressions could potentially be involved from one bid to the next. This means that with the number of bid wins, a bidder may need to track different numbers of impressions to make sure that a target number of impressions is being achieved over some time interval that may be specified in a campaign plan.

FIG. 1 is a drawing 10 illustrating a known methodology for multiple auctions with multicast spot inventory where a bid opportunity can correspond to multiple impressions with the number of impressions possibly varying from one multicast spot to another and with different bid opportunities including different multipliers to indicate the number of impressions a bid opportunity may correspond to. In the exemplary system shown in FIG. 1, supply side platform (SSP) 12 sends a single opportunity 18 for spot based auction in programmatic exchange with an impression multiplier data element (e.g., 5) to demand side platform (DSP) 14. The DSP 14 produces and sends bid response 20 in response to the request 18. The impression multiplier requires DSP 14 to adjust pacing, budgeting, and reporting to accommodate abnormal spikes in bidding structure. This can be complicated requiring various technical operations and conversions to make sure a campaign plan is being met and also complicate the messaging since multipliers need to be communicated and taken into account when considering bid opportunities and responding to such bid opportunities. The SSP 12 transmits order 22 to ad server 16 for spot execution upon completion of the auction.

While some bidders may take the time and technical effort to be able to deal with bid opportunities where multiple impressions correspond to a single bid and/or the number of impressions may vary from one bid opportunity to the next, some bidders will simply opt out of participating in bid opportunities with multipliers because of the technical difficulty of dealing with such bid opportunities.

From the perspective of a communications service provider seeking to maximize the number of potential users competing for the use of presentation opportunities it would be desirable if methods and/or apparatus could be developed which would simply the bidding process even when an impression opportunity corresponds to multiple impressions, e.g., because of the delivery technique associated with delivering the content corresponding to the impression. In addition it would be desirable if the methods and/or apparatus could be applied to the context of QAM delivery techniques where switched digital and/or other content delivery methods where the delivery of a creative or other content may be to multiple devices, e.g., set top boxes or end user devices, in a local region with the number of impressions to which a particular opportunity corresponds may be greater than one but may be different for other regions or presentation opportunities. In particular, it would be desirable if DSPs could interact in a manner that allows bids to be placed for single impressions without the need to deal with multipliers even in the case where a bid might correspond to a multi-impression opportunity due to the use of multicast or QAM delivery to multiple devices at the same time.

SUMMARY

Methods and apparatus relating to content delivery are described. In various embodiments content e.g., a creative in the form of an advertisement, is delivered to multiple devices without the need for a unicast content delivery to each device. QAM switched digital video delivery, multicast content delivery or other techniques which allow for content to be delivered to multiple devices at the same time are used for efficient delivery of the same piece of content to multiple different devices. Use of one or more such content delivery methods avoids the use, in at least some embodiments, of unicast content delivery to individual set top boxes (STBs) or other types of devices which can display program content such as TV programs or movies with inserted content such as advertisements.

While a single piece of content, e.g., advertisement may be, and often is, delivered to multiple devices through a QAM or multicast communications technique, with each receiving device corresponding to an impression opportunity, e.g., ad display opportunity, in at least some cases, in various embodiments presentation opportunities can be bid on a per presentation opportunity basis with the multiple presentation opportunities corresponding to delivery of a piece of content corresponding in some embodiments to a single deal identified by a deal identifier.

In various embodiments bidders are provided the opportunity to bid on presented opportunities, e.g., impression opportunities, on an individual single impression opportunity basis even when the impression corresponds to a multicast or QAM content delivery method. In the case of a QAM or multicast content delivery method, the content may be, and sometimes is, delivered to multiple devices providing N presentation opportunities, but even in such a case bidders can bid on a single presentation opportunity, e.g., with N bids needing to be won by a single bidder before the winning bidder of the deal is determined, and the content (creative), corresponding to the winning bidder of the deal with N presentation opportunities, will be delivered. As part of a deal, the content may be delivered to N different devices with each device being responsible for one impression. Alternatively, one or more of the devices may be responsible for presenting multiple impressions to a user at different times as part of the deal. Thus, the number of devices to which the content is delivered for presentation can, but need not match, the number of total impressions to be presented as part of the deal, and some devices may show the creative multiple times, e.g., at different points during a TV program or during different TV programs viewed by a user of a device receiving the ad content to reach the total number of N impressions. By providing N or more single impression bidding opportunities, a bidder's system need not deal with multipliers when bidding on presentation opportunities. While N bids corresponding to a deal may have to be won before the content, e.g., advertisement also referred to sometimes as an ad, will be delivered, the bidding process is simplified to one that relates to bids for single impressions. Thus in at least some embodiments, a single bid opportunity corresponding to a deal relating to N impression opportunities and identified by a corresponding deal identifier need not and will not include a multiplier value since the individual offer being bid upon is for a single impression opportunity. The deal identifier in the bid may, and often will, correspond to a deal where the content is to be delivered by multicast and/or QAM delivery to N devices. In at least some such embodiments N bids may be required to be won before content is delivered for presentation during an impression opportunity.

Because impression opportunity offers and bids are for single impressions the bidder systems, e.g., DSP servers used to place bids, need not deal with multipliers when receiving, considering and placing bids on impression opportunities on behalf of a bidder, e.g., under a bidder's control. This allows DSPs which may normally be used to place bids on single Internet delivered impressions, to bid on impression opportunities in QAM or multicast delivered program content, e.g., linear TV program content, without having to deal with the complexity of multipliers that might otherwise have to be considered given that the same content, e.g., ad, will be delivered to multiple devices and thus in many cases provide multiple, e.g., N, impression opportunities. In some embodiments, content is delivered after a winner of the N impression deal is determined but not upon a win of a single impression opportunity bid since the deal requires multiple bids to be won to win the deal.

In contrast to some other systems, when a single bid corresponding to a deal for N impression opportunities is won, the content corresponding to the winning bid will not be scheduled for delivery until N bids corresponding to an N impression opportunity deal are won by an individual bidder. Since different bidders may win some auctions corresponding to a deal, it may take more than N individual impression bidding opportunities before the winning bidder is determined. Thus, in the case where N is greater than one, as is the case with a multi-impression QAM or multicast deal, a single individual bidder will have to win N bids on individual impression opportunities before the winner of a deal is determined and content is delivered in accordance with some embodiments described herein.

While tracking of multiple individual bid wins for single impression opportunities adds complexity to the task of determining the winner of the deal, the complexity can be addressed in the system being used to offer the bid opportunities and determine the winning bids and eventually the winner of an N opportunity deal. The tracking can be implemented in the supply side platform (SSP) sending impression opportunity messages (bid requests), e.g., bid opportunities, to DSPs and which receives bid messages (bid responses) and determines the winning bids. Thus, DSP systems used by bidders need not be concerned with the complexity of the fact that the delivery method results in N impressions for a content, e.g., creative, delivery and can interact with the SSP as if bidding on individual impression opportunities. While this may increase the number of bid offer messages and bid messages as compared to using multipliers in impression opportunity offer messages, the technical advantages of allowing DSPs to operate without having to support or take into consideration multiplier values in impression opportunity offers or bids can be considerable since there are often far more bidders and DSPs than SSPs. By concentrating the complexity of having to deal with N impressions per delivery event at the SSP rather than the DSPs, DSP logic and hardware requirements can be reduced as compared to systems where DSPs are required to support and consider multiplier values in impression offers and/or bid responses.

One exemplary embodiment is directed to a content delivery method, e.g., implemented by a SSP server and involving the steps of communicating a first individual impression based auction opportunity corresponding to a first deal to one or more DSP servers, said first deal involving delivery of content (e.g., a first creative in the form of an ad) via a QAM or multicast delivery method to a plurality of end point devices, said first deal being a content delivery deal, said content delivery deal being for a number of N impressions (e.g., where an individual impression corresponds to display of content, e.g., an ad, on an individual end point device), where N is a number greater than 1. The method further includes receiving, e.g., at the SSP server, one or more bid responses in response to the first individual impression based auction opportunity and determining, based on the one or more bid responses received in response to the first individual impression based auction opportunity, a winner of the first individual impression based auction opportunity of the first deal. The exemplary method also includes updating a first deal win counter corresponding to the winner of the first individual impression based auction opportunity of the first deal, the first deal win counter being one of a plurality of first deal win counters, each of the first deal win counters corresponding to a different bidder. Since N is a number greater than 1 and thus the deal relates to more than 1 impression opportunity, the method also includes communicating a second individual impression based auction opportunity corresponding to the first deal to the one or more DSP servers and determining based on the one or more bid responses received in response to the second individual impression based auction opportunity, a winner of the second individual impression based auction opportunity of the first deal. The method also includes updating a first deal win counter corresponding to the winner of the second individual impression based auction opportunity. In the case where the winner of the first and second bid opportunities corresponding to the first deal are the same bidder the same win counter corresponding to the first deal will be updated after the first and second bid winners are then determined.

A check is made after a counter update due to a wining bid corresponding to the first deal to determine when a first deal win counter in said plurality of first deal win counters reaches a number matching the number N of impressions included in the first deal, the first deal win counter to reach the number N being a winner of the first deal. A winner of the first deal is determined based on a win counter corresponding to the first deal reaching N. Thus, in some embodiments the method includes identifying (e.g., declaring a deal winner) of the first deal, in response to said checking determining one of the first deal win counters in said plurality of first deal win counters reached the number N. The winner of the first deal that is identified is the bidder corresponding to the first deal win counter which reached the number N (e.g., bidder 1 is declared winner in response to determining that bidder 1 won 5 individual impression based auction opportunities corresponding to the first deal when in the example N=5). Once a deal winner is determined, content delivery, e.g., delivery of a creative in the form of an ad identified and/or supplied by the winning bidder, is initiated. Thus, in some embodiments the method further includes initiating delivery (e.g., by sending a request to download the creative to be delivered on behalf of the winner) of a creative (e.g., ad) identified or supplied by the winning bidder to multiple (e.g., N) end point devices (set top boxes or TVs) via a QAM content delivery channel in response to identification of the winner of the first deal.

While explained in the context of using QAM content delivery to cable set top boxes or other play back devices with STB capability, e.g., a smart TV with a QAM demodulator, the methods and apparatus can be used in a wide variety of content delivery applications where content corresponding to N impressions is to be delivered to multiple different devices at the same time to support display of content such as a creative supplied or identified by a winning bidder.

Numerous variations on the above described methods and apparatus will be apparent based on the detailed description which follows.

BRIEF DESCRIPTION OF THE FIGURES

FIG. 3G is a seventh part of a ladder diagram illustrating an exemplary content delivery method being performed by devices of system of FIG. 2 in accordance with an exemplary embodiment.

FIG. 3 comprises the combination of FIG. 3A, FIG. 3B, FIG. 3C, FIG. 3D, FIG. 3E, FIG. 3F and FIG. 3G.

DETAILED DESCRIPTION

Figure 1:
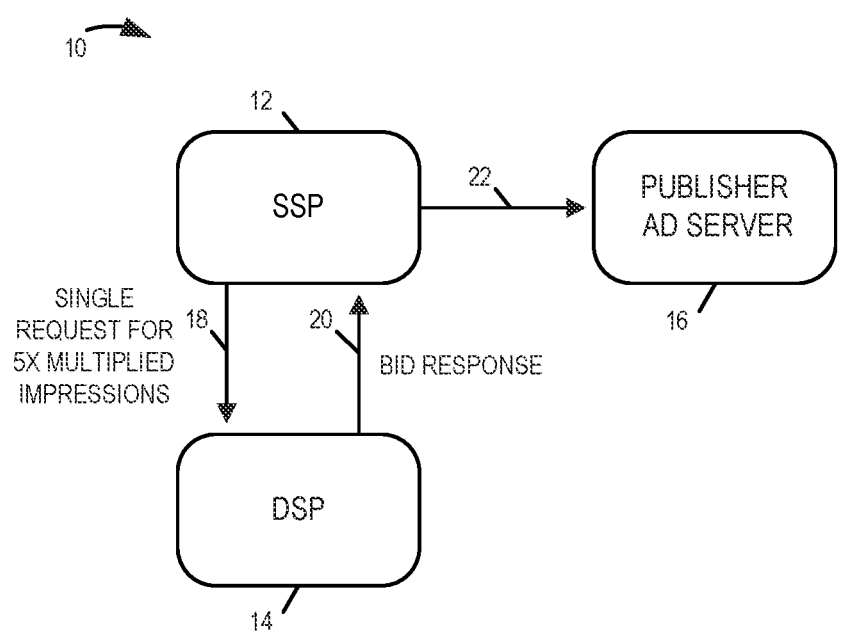
FIG. 1 is a drawing illustrating a known methodology for multiple bid auctions with multicast spot inventory in which multipliers are used in offers and/or bid responses.
Figure 2:
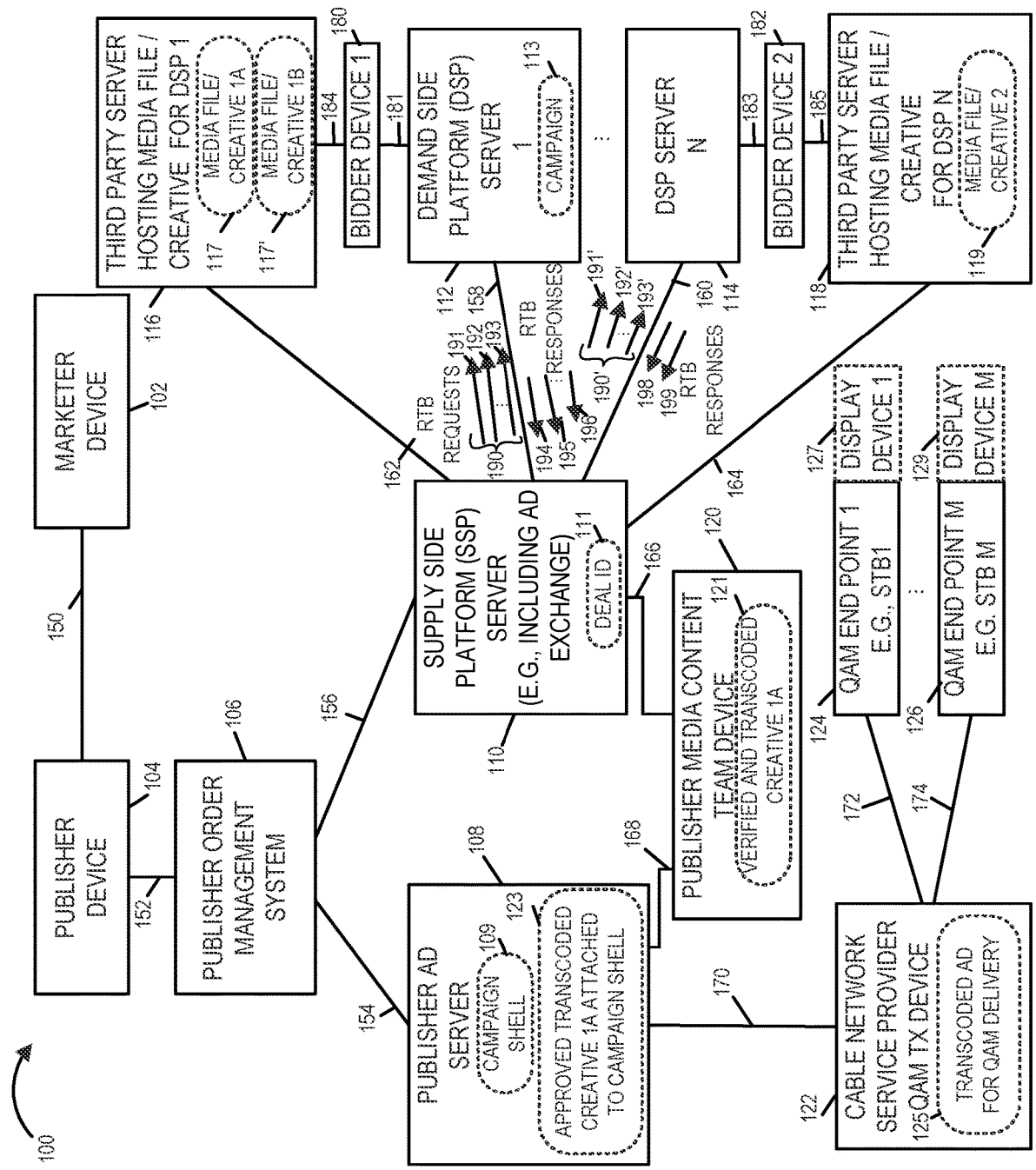
FIG. 2 is a drawing of an exemplary system supporting a method of ad bidding and ad publishing in accordance with an exemplary embodiment.
Figure 3A:
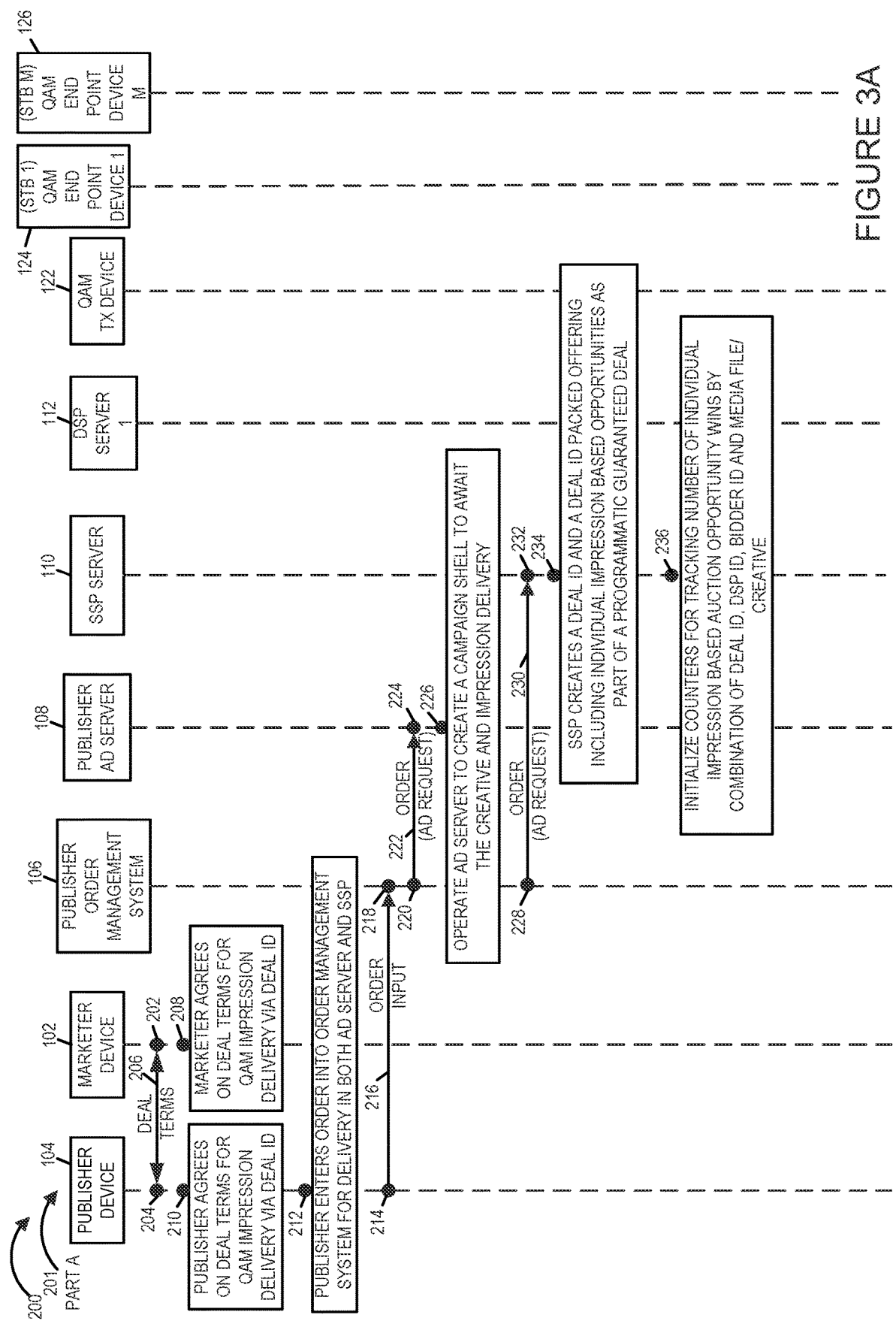
FIG. 3A is a first part of a ladder diagram illustrating an exemplary content delivery method being performed by devices of system of FIG. 2 in accordance with an exemplary embodiment.
Figure 3B:
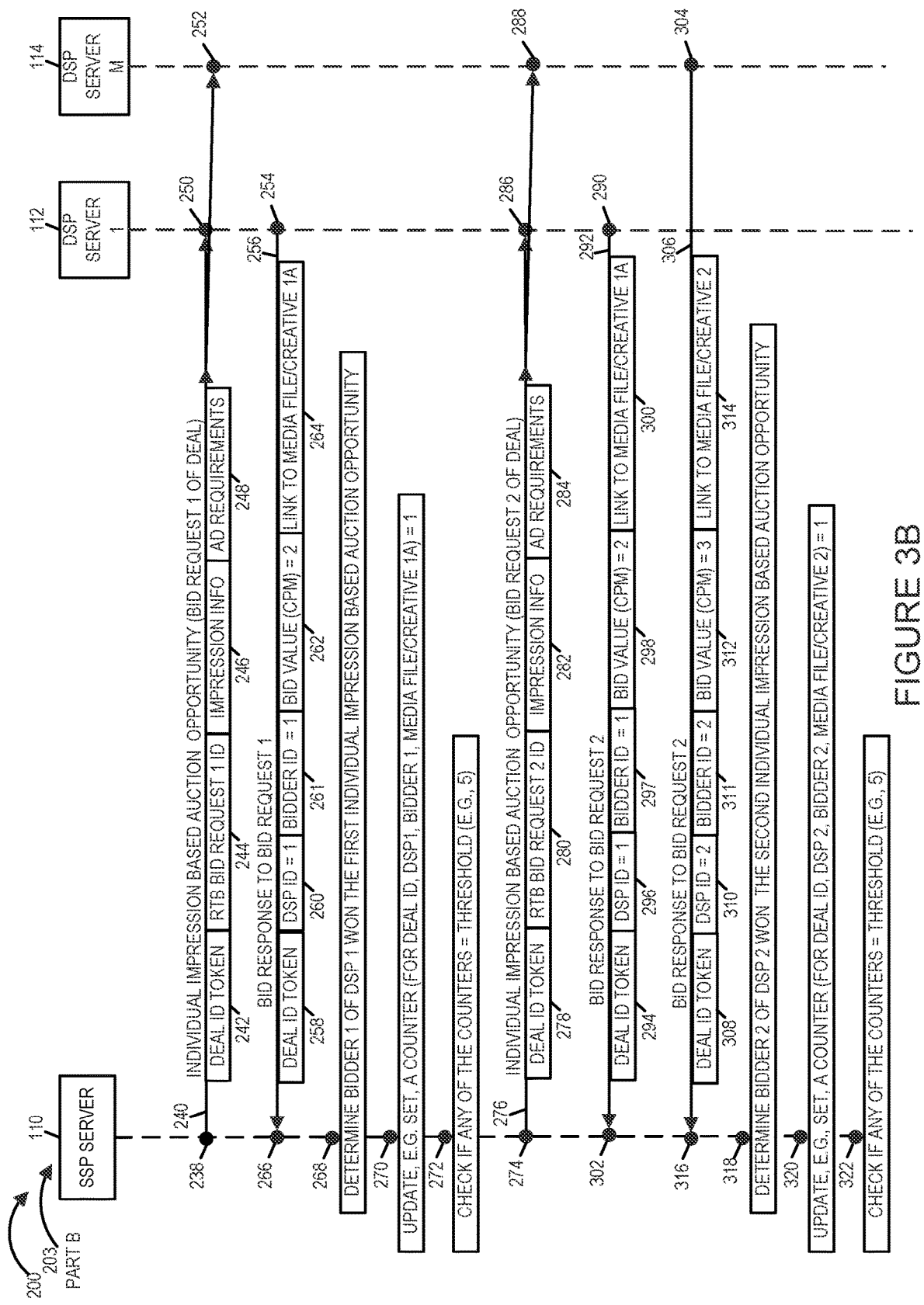
FIG. 3B is a second part of a ladder diagram illustrating an exemplary content delivery method being performed by devices of system of FIG. 2 in accordance with an exemplary embodiment.
Figure 3C:
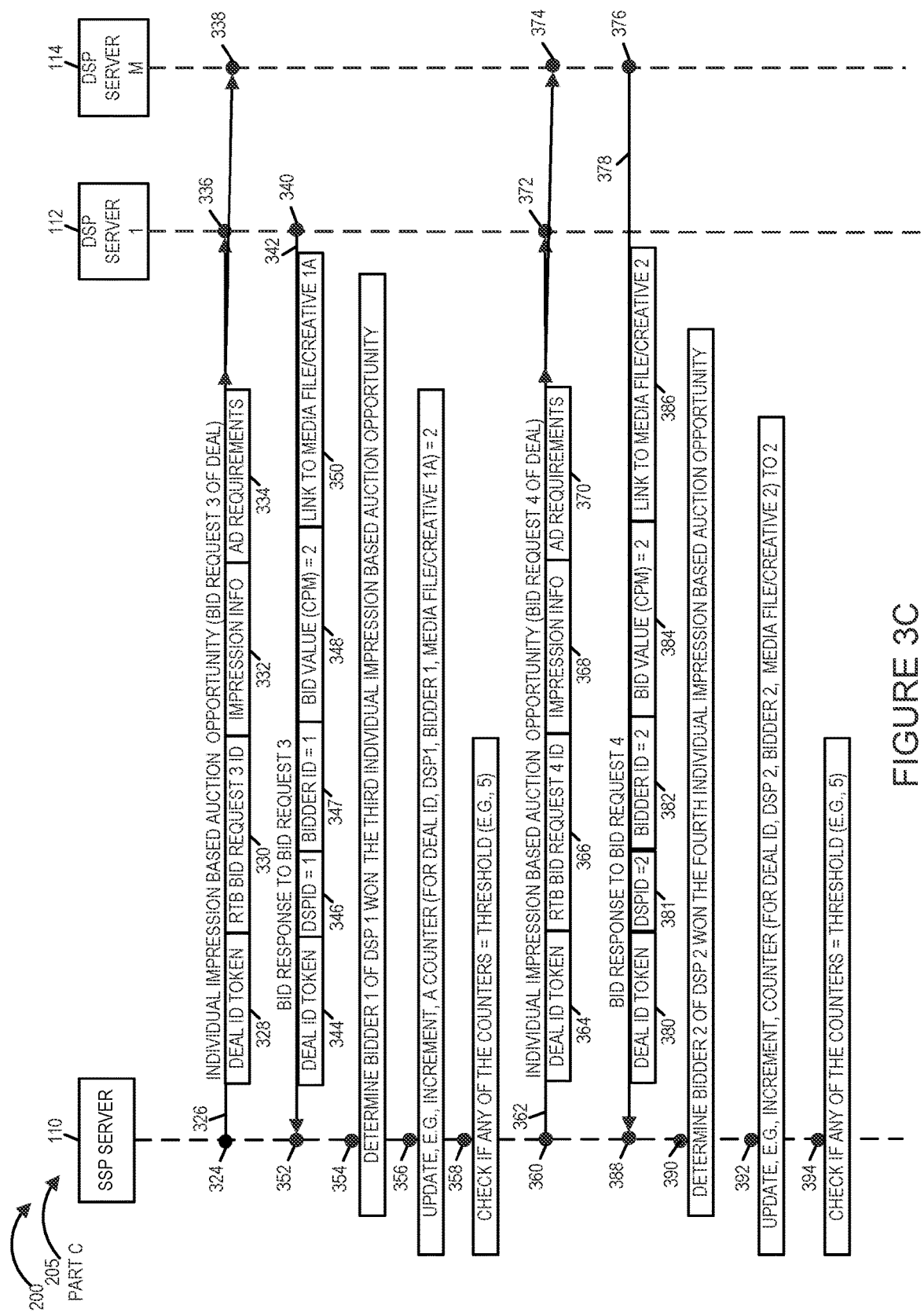
FIG. 3C is a third part of a ladder diagram illustrating an exemplary content delivery method being performed by devices of system of FIG. 2 in accordance with an exemplary embodiment.
Figure 3D:
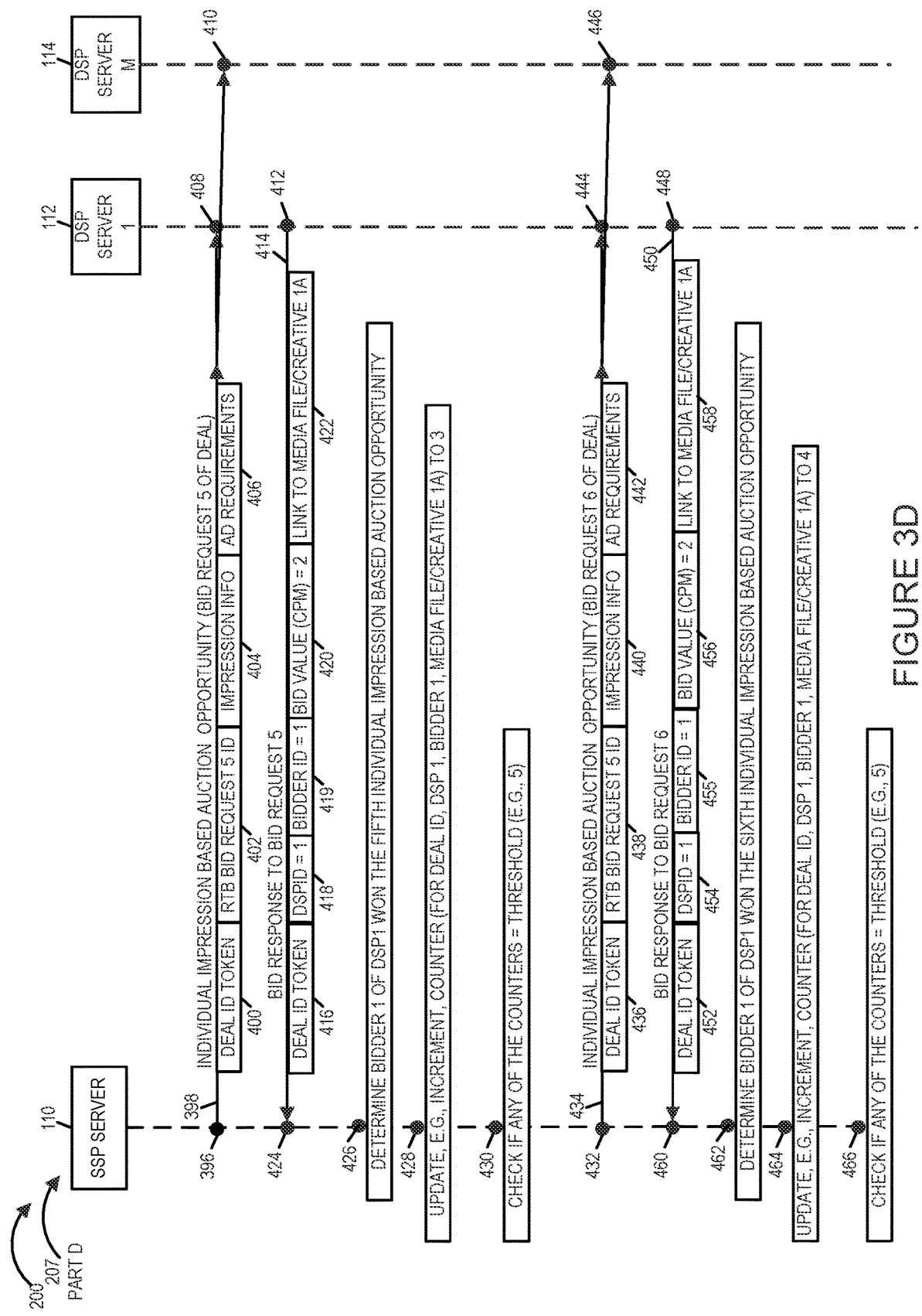
FIG. 3D is a fourth part of a ladder diagram illustrating an exemplary content delivery method being performed by devices of system of FIG. 2 in accordance with an exemplary embodiment.
Figure 3E:
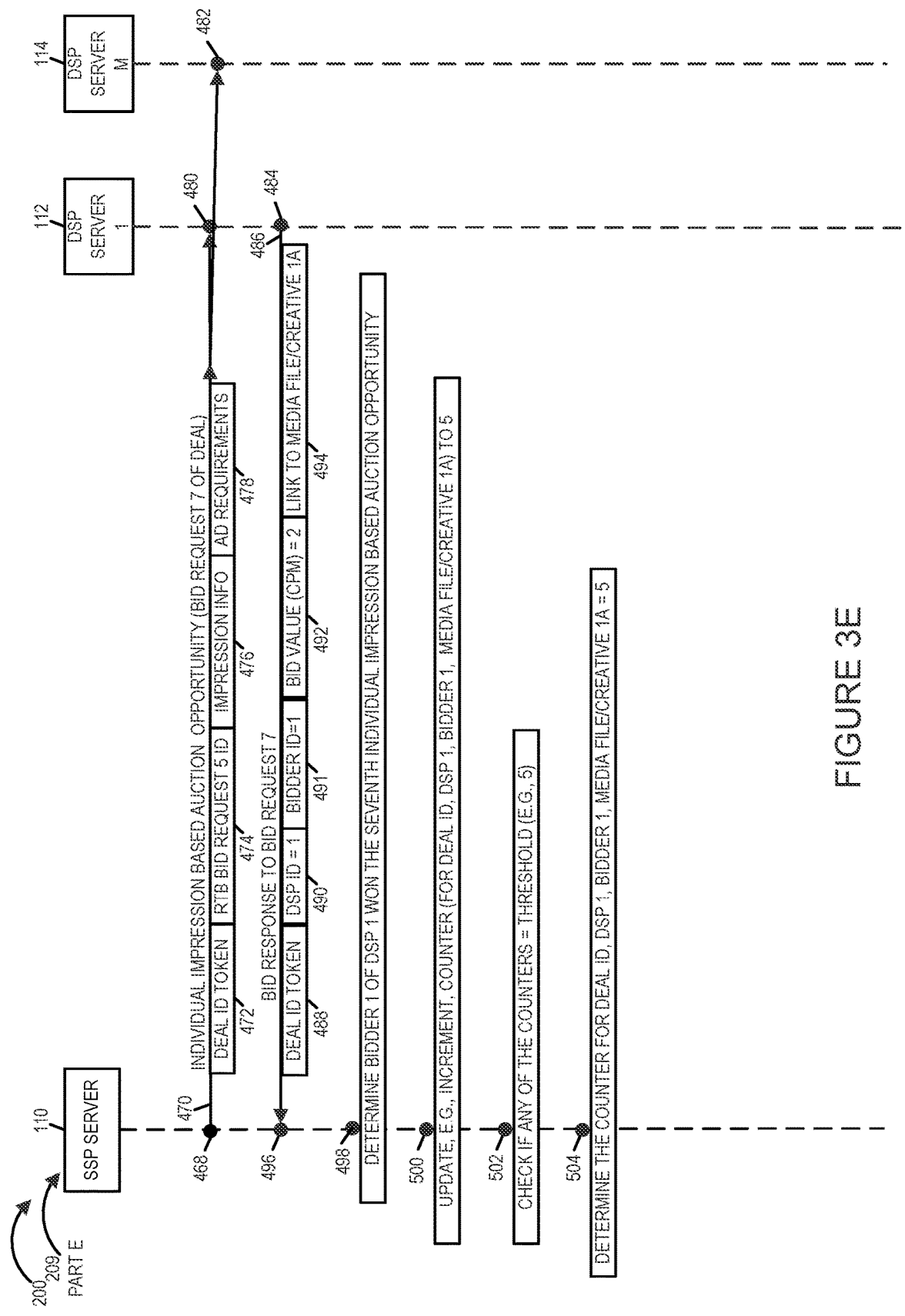
FIG. 3E is a fifth part of a ladder diagram illustrating an exemplary content delivery method being performed by devices of system of FIG. 2 in accordance with an exemplary embodiment.
Figure 3F:
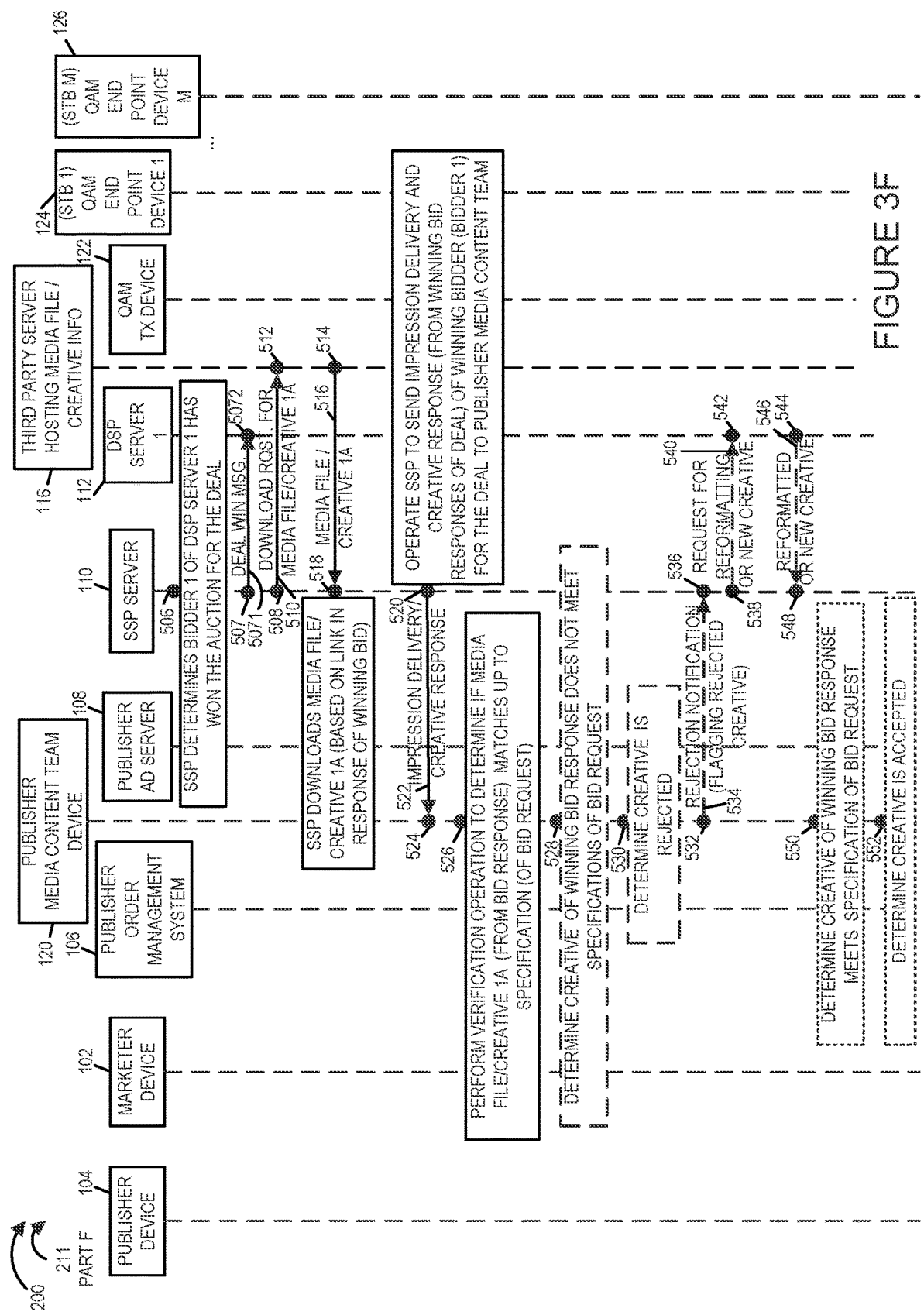
FIG. 3F is a sixth part of a ladder diagram illustrating an exemplary content delivery method being performed by devices of system of FIG. 2 in accordance with an exemplary embodiment.

FIG. 2 is a drawing of an exemplary system 100 supporting a method of ad bidding, ad publishing and content delivery in accordance with an exemplary embodiment. Exemplary system 100 includes a marketer device 102, a publisher device 104, a publisher order management system 106, a publisher ad server 154, a supply side platform (SSP) server 110, a plurality of demand side platform (DSP) servers (DSP server 1 112, . . . , DSP server N 114), a third party server hosting media files/creative for DSP 1 116, a third party server hosting media files/creative for DSP N 118, a publisher media content team device 120, a cable network service provider quadrature amplitude modulation (QAM) transmitter (TX) device 122, and a plurality of QAM end point devices (QAM end point 1 124, e.g., STB 1, . . . , QAM end point M 126, e.g., STP M) coupled together as shown. System 100 further includes a plurality of display devices (display device 1 127, . . . , display device M 129). In some embodiments, the display devices (127, . . . , 129) are coupled to the QAM end point devices (124, . . . , 126) respectively. In some embodiments, a QAM end point device, e.g., a STB, may be, and sometimes is, included as part of a display device, e.g., a TV with an integrated STB. SSP server 110, in some embodiments, includes an ad exchange. In other embodiments, the system 100 includes an external ad exchange between the SSP 110 and the DSPs (112, . . . 114). Exemplary system 100 further includes a plurality of bidder devices including bidder device 1 180 and bidder device 2 182.

Marketer device 102, e.g., a desktop computer, is coupled to publisher device 104, e.g., another desktop computer, via communications link 150. Publisher device 104 is coupled to publisher order management system 106 via communications link 152. Publisher order management system 106 is coupled to publisher ad server 108 via communications link 154. Publisher order management system 106 is coupled to SSP server 110 via communications link 156. SSP server 110 is coupled to DSP server 1 112 via communications link 158. SSP server 110 is coupled to DSP server N 114 via communications link 160. SSP server 110 is coupled, via communications link 162, to third party server 116, which is hosting media files/creatives for DSP 1. SSP server 110 is coupled, via communications link 164, to third party server 118, which is hosting media files/creatives for DSP N. SSP server 110 is coupled to publisher media content team device 120 via communications link 166. Publisher media content team device 120 is coupled to publisher ad server 108 via communications link 168. Publisher ad server 108 is coupled to cable network service provider QAM TX device 122 via communications link 170. Cable network service provider QAM TX device 122 is coupled to QAM end point device 1 124 via communications link 172. QAM end point device 1 124 is coupled to display device 1 125. Cable network service provider QAM TX device 122 is coupled to QAM end point device M 126 via communications link 174. QAM end point device M 126 is coupled to display device M 127. Bidder device 1 180 is coupled to DSP server 1 112 via communications link 181. Bidder device 2 182 is coupled to DSP server N 114 via communications link 183. Bidder device 1 is coupled to third party server 116 via communications link 184. Bidder device 2 is coupled to third party server 118 via communications link 185. The various communications links (150, 152, 154, 156, 158, 160, 162, 164, 166, 168, 170, 172, 174, 181, 183, 184, 185) are, e.g., Internet connections, network connections, and/or cable network service provider connections.

Exemplary data/information included on devices and exemplary signaling, corresponding to an example, are also shown in FIG. 2. Publisher ad server 108 includes a campaign shell 109 and approved transcoded creative 1A attached to the campaign shell 123. SSP server 110 includes a deal ID 111. Third part server 116 includes media file/creative 1A 117 and media file/creative 1B 117'. DSP server 1 includes campaign 113. Third party server 118 includes media file/creative 2 119. Publisher media content team device 120 includes verified and transcoded creative 1A 121. Cable network service provider QAM TX device 122 includes transcoded ad 125 for QAM delivery to multiple QAM end point devices.

Publisher ad server 108 generate a campaign shell. SSP server 110 generates a deal ID 111.

A set 190 of real-time bidding (RTB) requests (191, 192, . . . , 193) are sent, via communications link 158, from SSP server 110 to DSP server 1 112. A set 190' of real-time bidding (RTB) requests (191' 192', . . . , 193') are sent, via communications link 160, from SSP server 110 to DSP server N 114. Set 190' of real-time bidding (RTB) requests is a copy of the set 190' RTB requests, except with a different destination. DSP server 1 112 sends, via communications link 158, RTB responses (194, 195, . . . , 196) to SSP 110, each individual RTB response being in response to an individual RTB request. DSP server 2 114 sends, via communications link 160, RTB responses 198, 199 to SSP 110, each individual response being in response to an individual RTB request. DSP server 1 112 is generating and sending RTB responses on behalf of bidder devices including bidder device 1 180. DSP server N 114 is generating and sending RTB responses on behalf of bidder devices including bidder device 2 182.

FIG. 3, comprising the combination of FIG. 3A, FIG. 3B, FIG. 3C, FIG. 3D, FIG. 3E, FIG. 3F and FIG. 3G, is a ladder diagram 200, comprising the combination of Part A 201, Part B 203, Part C 205, Part D 207, Part E 209, Part F 211 and Part G 213, illustrating an exemplary content delivery method being performed by devices of system 100 of FIG. 2 in accordance with an exemplary embodiment.

In steps 204 and 206 the publisher device 104 and the marketer device exchange deal terms communications 206. In step 210 the publisher agrees on deal terms for QAM impression delivery via deal ID. In step 208 the marketer agrees on deal terms for QAM impression delivery via deal ID. In step 212 the publisher enters, via publisher device 104, an order into the order management system 106 for delivery in both ad server 108 and SSP 108. In step 214 the publisher device 104 sends order into signal 216 to publisher order management system 106. In step 218 the publisher order management system 106 receives the order input 216. In step 220 the publisher order management system 106 generates and sends order 222, which is an ad request, to publisher ad server 108. In step 224 the publisher ad server 108 receives the order, and in response, in step 226, the publisher ad server 108 is operated to create and store a campaign shell to await the creative and impression delivery. In step 228 the publisher order management system 106 generates and sends an order 230, which is an ad request, to the SSP server 110.

In step 232 the SSP server 110 receives the order (ad request) 230, and in response in step 234 the SSP 110 creates a deal ID (sometimes referred to as a deal ID token) and a deal ID packed offering including individual impression based opportunities as part of a programmatic guaranteed deal. In step 236 the SSP server 110 initializes, e.g., sets to 0), counters for tracking number of individual impression based auction opportunity wins by a combination of deal ID, SSP ID, bidder ID and media/file creative. In step 238 the SSP server 110 generates and sends a first individual impression based auction opportunity (which is RTB bid request 1 of the deal) 240 to DSP server 1 112 and DSP server N 114. Bid request 1 240 includes deal ID token 242, RTB bid request 1 ID 244, impression information 246 and ad requirements 248. In step 250 DSP server 1 112 receives bid request 1 240, and in step 252 DSP server N 114 receives bid request 1 240. Bidder 1, operating via DSP server 1 112, decides to place a bid in response to bid request 1. In step 254 DSP server 1 112 generates and sends BID response 256 in response to bid request 1. Bid response 256 includes deal ID token 258, DSP ID=1 260, bidder ID=1 261, bid value (CPM)=2, and link to media file/creative 1A 264. The term Cost Per Mile (CPM) is a cost, e.g., in dollars, per thousand impressions. In step 266 SSP server 110 receives bid response 256 and recovers the communicated information. In step 268 the SSP server 110 determines that bidder 1 (operating via DSP 1) is the winner of the first individual impression based auction opportunity of the deal. In step 270 the SSP server 110 updates, e.g., sets, a bid deal win counter (corresponding to the combination of deal ID, DSP 1, bidder 1, and media file/creative 1A)=1. In step 272 the SSP server 110 checks to determine if any of the bid deal win counters=the win threshold value, e.g., 5, for winning the deal. At this point none of the bid deal win counters has reached the threshold, so the SSP server 110 proceeds to generate another individual impression based auction opportunity.

In step 274 the SSP server 110 generates and sends a second individual impression based auction opportunity (which is RTB bid request 2 of the deal) 276 to DSP server 1 112 and DSP server N 114. Bid request 2 276 includes deal ID token 278, RTB bid request 2 ID 280, impression information 282 and ad requirements 284. In step 286 DSP server 1 112 receives bid request 2 276, and in step 252 DSP server N 114 receives bid request 2 276. Bidder 1, operating via DSP server 1 112, decides to place a bid in response to bid request 2. In step 290 DSP server 1 112 generates and sends BID response 292 in response to bid request 2. Bid response 292 includes deal ID token 294, DSP ID=1 296, bidder ID=1 297, bid value (CPM)=2 298, and link to media file/creative 1A 300. In step 302 SSP server 110 receives bid response 292 and recovers the communicated information. Bidder 2, operating via DSP server N 114, also decides to place a bid in response to bid request 2. In step 302 SSP server 110 receives bid response 292 and recovers the communicated information. In step 304 DSP server N 114 generates and sends bid response 306 in response to bid request 2. Bid response 306 includes deal ID token 308, DSP ID=2 310, bidder ID=2 311, bid value (CPM)=3 312, and link to media file/creative 2 314. In step 316 SSP server 110 receives bid response 306 and recovers the communicated information. In step 318 the SSP server 110 determines that bidder 2 (operating via DSP 2) is the winner of the second individual impression based auction opportunity of the deal. In step 320 the SSP server 110 updates, e.g., sets, a bid deal win counter (corresponding to the combination of Deal ID, DSP 2, bidder 2, and media file/creative 2)=1. In step 322 the SSP server 110 checks to determine if any of the bid deal win counters=the win threshold value, e.g., 5, for winning the deal. At this point none of the bid deal win counters has reached the threshold: therefore, the SSP server 110 proceeds to generate another individual impression based auction opportunity.

In step 324 the SSP server 110 generates and sends a third individual impression based auction opportunity (which is RTB bid request 3 of the deal) 326 to DSP server 1 112 and DSP server N 114. Bid request 3 326 includes deal ID token 328, RTB bid request 3 ID 330, impression information 332 and ad requirements 334. In step 336 DSP server 1 112 receives bid request 3 326, and in step 338 DSP server N 114 receives bid request 3 326. Bidder 1, operating via DSP server 1 112, decides to place a bid in response to bid request 3. In step 340 DSP server 1 112 generates and sends BID response 342 in response to bid request 3. Bid response 342 includes deal ID token 344, DSP ID=1 346, bidder ID=1 347, bid value (CPM)=2 348, and link to media file/creative 1A 350. In step 354 the SSP server 110 determines that bidder 1 (operating via DSP 1) is the winner of the third individual impression based auction opportunity of the deal. In step 356 the SSP server 110 updates, e.g. increments, the bid deal win counter (corresponding to the combination of Deal ID, DSP 1, bidder 1, and media file/creative 1A), which sets the bid deal win counter (corresponding to the combination of DSP 1, bidder 1, and media file/creative 1A)=2. In step 358 the SSP server 110 checks to determine if any of the bid deal win counters=the win threshold value, e.g., 5, for winning the deal. At this point none of the bid deal win counters has reached the threshold: therefore, the SSP server 110 proceeds to generate another individual impression based auction opportunity.

In step 360 the SSP server 110 generates and sends a fourth individual impression based auction opportunity (which is RTB bid request 4 of the deal) 362 to DSP server 1 112 and DSP server N 114. Bid request 4 362 includes deal ID token 364. RTB bid request 4 ID 366, impression information 368 and ad requirements 370). In step 372 DSP server 1 112 receives bid request 4 362, and in step 374 DSP server N 114 receives bid request 4 362. Bidder 2, operating via DSP server N 114, decides to place a bid in response to bid request 4. In step 376 DSP server N 114 generates and sends BID response 378 in response to bid request 4. Bid response 378 includes deal ID token 380, DSP ID=2 381, bidder ID=2 382, bid value (CPM)=2 384, and link to media file/creative 2 386. In step 388 the SSP server 110 receives bid response 378 and recovers the communicated information. In step 390 the SSP server 110 determines that bidder 2 (operating via DSP 2) is the winner of the fourth individual impression based auction opportunity of the deal. In step 392 the SSP server 110 updates, e.g., increments, the bid deal win counter (corresponding to the combination of Deal ID, DSP 2, bidder 2, and media file/creative 2), which sets the bid deal win counter (corresponding to the combination of deal ID, DSP 2, bidder 2, and media file/creative 2)=2. In step 394 the SSP server 110 checks to determine if any of the bid deal win counters=the win threshold value, e.g., 5, for winning the deal. At this point none of the bid deal win counters has reached the threshold; therefore, the SSP server 110 proceeds to generate another individual impression based auction opportunity.

In step 396 the SSP server 110 generates and sends a fifth individual impression based auction opportunity (which is RTB bid request 5 of the deal) 398 to DSP server 1 112 and DSP server N 114. Bid request 5 398 includes deal ID token 400, RTB bid request 5 ID 402, impression information 404 and ad requirements 406. In step 408 DSP server 1 112 receives bid request 5 398, and in step 410 DSP server N 114 receives bid request 5 398. Bidder 1, operating via DSP server 1 112, decides to place a bid in response to bid request 5. In step 412 DSP server 1 112 generates and sends BID response 414 in response to bid request 5. Bid response 414 includes deal ID token 416, DSP ID=1 418, bidder ID=1 419, bid value (CPM)=2 420, and link to media file/creative 1A 422. In step 424 SSP server 100 receives bid response 414 and recovers the communicated information. In step 426 the SSP server 110 determines that bidder 1 (operating via DSP 1) is the winner of the fifth individual impression based auction opportunity of the deal. In step 428 the SSP server 110 updates, e.g., increments, the bid deal win counter (corresponding to the combination of deal ID, DSP 1, bidder 1, and media file/creative 1A), which sets the bid deal win counter (corresponding to the combination of deal ID, DSP 1, bidder 1, and media file/creative 1A)=3. In step 430 the SSP server 110 checks to determine if any of the bid deal win counters=the win threshold value, e.g., 5, for winning the deal. At this point none of the bid deal win counters has reached the threshold: therefore, the SSP server 110 proceeds to generate another individual impression based auction opportunity.

In step 432 the SSP server 110 generates and sends a sixth individual impression based auction opportunity (which is RTB bid request 6 of the deal) 434 to DSP server 1 112 and DSP server N 114. Bid request 6 434 includes deal ID token 436, RTB bid request 6 ID 438, impression information 440) and ad requirements 442. In step 444 DSP server 1 112 receives bid request 6 434, and in step 446 DSP server N 114 receives bid request 6 434. Bidder 1, operating via DSP server 1 112, decides to place a bid in response to bid request 6. In step 448 DSP server 1 112 generates and sends BID response 450 in response to bid request 6. Bid response 450 includes deal ID token 452, DSP ID=1 454, bidder ID=1 455, bid value (CPM)=2 456, and link to media file/creative 1A 458. In step 460 SSP server 110 receives bid response 450 and recovers the communicated information. In step 462 the SSP server 110 determines that bidder 1 (operating via DSP 1) is the winner of the sixth individual impression based auction opportunity of the deal. In step 464 the SSP server 110 updates, e.g., increments, the bid deal win counter (corresponding to the combination of deal ID, DSP 1, bidder 1, and media file/creative 1A), which sets the bid deal win counter (corresponding to the combination of deal ID, DSP 1, bidder 1, and media file/creative 1A)=4. In step 466 the SSP server 110 checks to determine if any of the bid deal win counters=the win threshold value, e.g., 5, for winning the deal. At this point none of the bid deal win counters has reached the threshold: therefore, the SSP server 110 proceeds to generate another individual impression based auction opportunity.

In step 468 the SSP server 110 generates and sends a seventh individual impression based auction opportunity (which is RTB bid request 7 of the deal) 470 to DSP server 1 112 and DSP server N 114. Bid request 7 468 includes deal ID token 472, RTB bid request 7 ID 474, impression information 476 and ad requirements 478. In step 480 DSP server 1 112 receives bid request 7 470, and in step 482 DSP server N 114 receives bid request 7 470. Bidder 1, operating via DSP server 1 112, decides to place a bid in response to bid request 7. In step 484 DSP server 1 112 generates and sends BID response 486 in response to bid request 7. Bid response 486 includes deal ID token 488, DSP ID=1 490, bidder ID=1 491, bid value (CPM)=2 492, and link to media file/creative 1A 494. In step 496 SSP server 110 receives bid response 486 and recovers the communicated information. In step 498 the SSP server 110 determines that bidder 1 (operating via DSP 1) is the winner of the seventh individual impression based auction opportunity of the deal. In step 500 the SSP server 110 updates, e.g., increments, the bid deal win counter (corresponding to the combination of deal ID, DSP 1, bidder 1, and media file/creative 1A), which sets the bid deal win counter (corresponding to the combination of DSP 1, bidder 1, and media file/creative 1A)=5. In step 502 the SSP server 110 checks to determine if any of the bid deal win counters=the win threshold value, e.g., 5, for winning the deal. In step 504 the SSP server 110 determines that the bid deal win counter corresponding to deal ID, DSP 1, bidder 1 and media file/creative 1A is equal to the threshold value of 5.

In step 506 the SSP server 110 determines that bidder 1 (operating via DSP server 1 112) has won the auction for the deal. Thus, in step 506 the SSP server 110 identifies (e.g., declares) bidder 1 as the deal winner. In step 507 the SSP server 110 generates and sends a deal win notification message 5071 to DSP 1 112, said deal win notification message indicating that bidder 1 won the deal and further indicating the set of individual winning bid responses, said deal win notification message intended to be deliver to the winning bidder via the DSP 1 112. DSP 1 112 forwards the deal win notification message to bidder device 1 180 for presentation to bidder 1. In step 508 the SSP server 110 sends a download request 510 for media file/creative 1A to third part server 116 which is hosting media file/creative information for bidder 1. In step 512 the third party server 116 receives the request 510, and in response in step 514, the third party server 116 retrieves and sends, via signals 516, media file/creative 1A to SSP server 110. In step 518 the SSP downloads the media file/creative 1A. In some embodiments, the download is based on a link specified in the bid responses of the winning bids from the winning bidder of the deal.

In step 520 the SSP server 110 sends impression delivery/creative response information 522 (e.g., including information recovered from the download of the media file/creative information) corresponding to the winning bidder for the deal to publisher media content team device 120. In step 526 the publisher media content team device 120 performs a verification operation to determine if the media file/creative 1A (identified in or included in the winning bid responses corresponding to the winning bidder of the deal) matches up to the specification, e.g., QAM STB specification, of the bid requests.

If the verification operation of step 526 determines that the creative included in or specified by the bid responses, corresponding the deal win, does not meet the specification of the bid requests, as indicated by alternative step 528, then operation proceeds from step 528 to step 530, in which publisher media content team device 120 determines that the creative is rejected, and operation proceeds from step 530 to step 532.

Alternatively, if the verification operation of step 526 determines that the creative included in or specified by the bid responses, corresponding the deal win, does meet the specification of the bid requests, as indicated by alternative step 550, then operation proceeds from step 550 to step 552 in which publisher media content team device 120 determines that the creative is accepted, and operation proceeds from step 552 to step 554.

Returning to step 532, in step 532 publisher media content team device 120 generates and sends a rejection notification (e.g., flagging the rejected creative) to the SSP server 110. In step 536 the SSP server 110 receives the rejection notification 534, and in response, in step 538, the SSP server 110 generates and sends a request 540 for reformatting the creative or for a new creative to SPS server 1 112. In step 542 the SSP server 110 receives the request 540 for reformatting the creative or for a new creative, and in response, in step 544, DSP server 1 112 generates and sends a reformatted or new creative or information including a link to the reformatted or new creative. In step 548 the SSP server 110 receives the reformatted or new creative 546 or link to a accessing the reformatted or new creative and obtains, e.g., downloads the reformatted or new creative. Operation proceeds from step 548 back to step 526 for another verification operation to determine if the reformatted or new media file/creative matches up the QAM STB specification of the bid requests of the deal.

Returning to step 554, in step 554, following creative approval, the publisher media content team device (e.g., a transcoding engine included in the publisher media content team device 120) performs transcoding of the creative in accordance with specification. Operation proceeds from step 554 to step 556. In step 556 the publisher media content team device 120 sends the accepted transcoded creative 558 to publisher ad server 108, which receives the transcoded creative in step 560. In step 562 the publisher ad server 108 appends the received approved transcoded creative to the campaign shell (previously created in step 226), and in step 564 the publisher ad server 108 schedules delivery. In step 566 the publisher ad server 108 sends the transcoded ad 568 to QAM transmitter (TX) device 570. In step 572 QAM TX device 122 sends QAM ad signals 574 to a set (e.g., a set of 5) of QAM end point devices (STBs). In step 576 QAM end point device 1 124, e.g., STB 1, receives the transcoded QAM ad and presents the ad to a user of STB 1 via display device 1 127. In step 578 QAM end point device M (e.g., where M=5), e.g., STB M, receives the transcoded QAM ad and presents the ad to a user of STB M via display device M 129. Operation proceeds from step 578 to step 580. In step 580 the SSP server 110 updates accounting information indicating that the winning bidder (bidder 1) is responsible for paying the N (e.g., 5) individual bid amounts that were bid by the winning bidder in the N individual impression based auction opportunities corresponding to the first deal that were won by the winning bidder.

Figure 4:
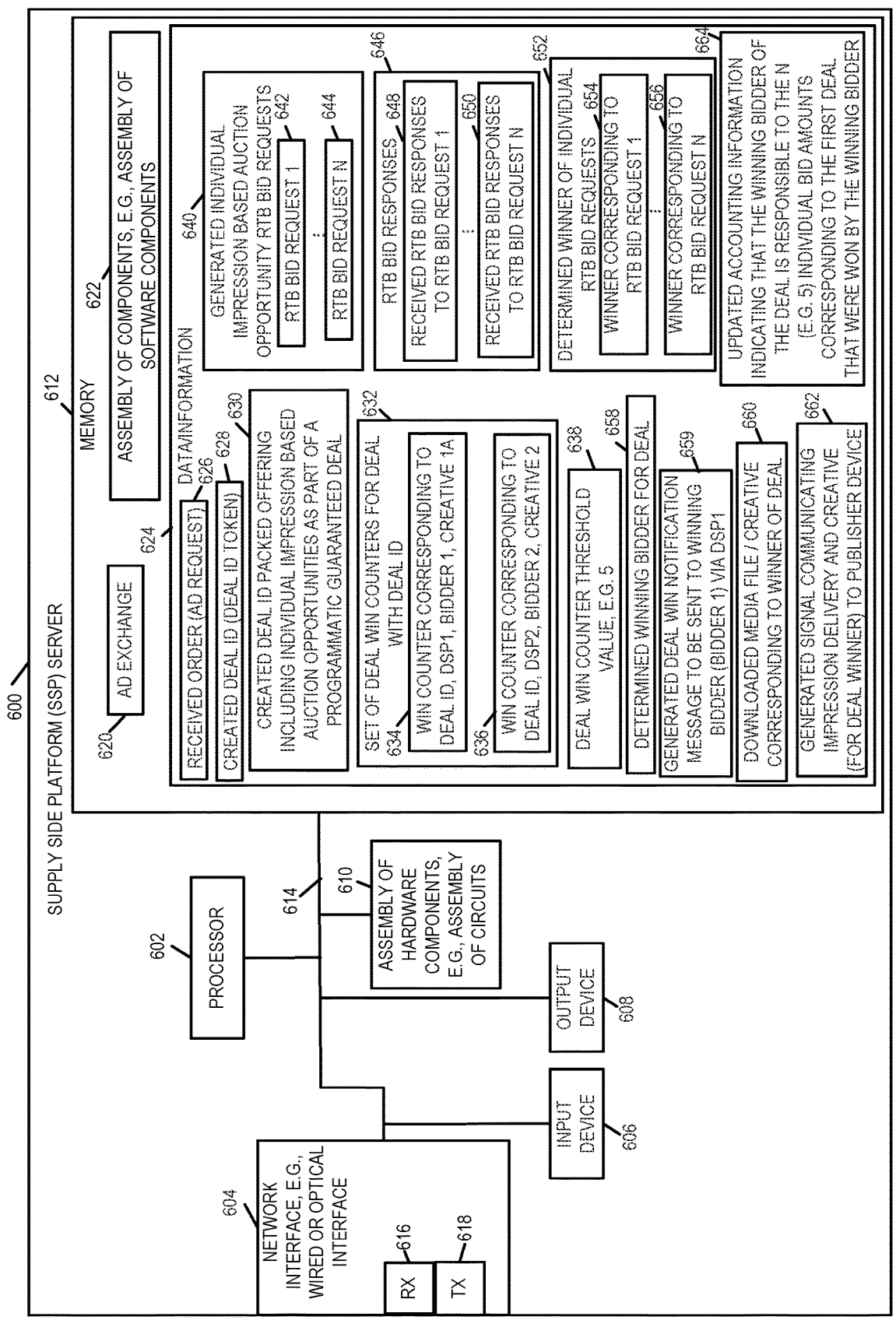
FIG. 4 is a drawing of an exemplary supply side platform (SSP) server in accordance with an exemplary embodiment.

FIG. 4 is a drawing of an exemplary supply side platform (SSP) server 600 in accordance with an exemplary embodiment. SSP server 600 is, e.g., SSP server 110 of system 100 of FIG. 2 and FIG. 3. SSP 600 includes a processor 602, e.g., a CPU, a network interface 604, an input device 606, e.g., a keyboard, an output device 608, e.g., a display, an assembly of hardware components 610, e.g., an assembly of circuits, and memory 612 coupled together via a bus 614 over which the various elements may interchange data and information.

Network interface 604, e.g., a wired or optical interface, includes a receiver 616 and a transmitter 618 via which the SSP server communicates with other devices, e.g., a publisher order management system, a demand side platform (DSP) server, a third part server hosting media files/creatives, and a publisher media content team device. Network interface 604 couples the SSP server 600 to other network nodes, network communications links and/or the Internet.

Memory 612 includes an ad exchange 620 an assembly of components 622, e.g., an assembly of software components, and data/information 624. Ad exchange 620 is, e.g., a routine, subroutine, set of code, or application, which handles ad auction functions including, e.g., receiving bids, comparing received bids, and determining a winner for each individual impression based auction opportunity. Assembly of components 622 includes, e.g., software, routines, subroutines, applications, etc., which, when executed by a processor, e.g., processor 602, implement various steps of an exemplary method performed by SSP server 600, e.g., steps shown and/or described with respect to SSP server 110 of system 100 with respect to FIG. 2 and/or FIG. 3.

Data/information 624 includes a received order (ad request) 626, a created deal ID 628, sometimes referred to as a deal ID token, a created deal ID packed offering 630 including individual impression based auction opportunities as part of a programmatic guaranteed deal, and a set 632 of deal win counters, each win counter corresponding to a deal ID, DSP ID, bidder ID and a creative. Set of deal win counters 632 includes win counter 634 corresponding to Deal ID, DSP 1, bidder 1 and creative 1A and win counter 636 corresponding to deal ID, DSP 2, bidder 2 and creative 2. Data/information 624 further includes a deal win counter threshold value 638, e.g., 5, indicating how many individual impression auction based auction opportunities a bidder needs to win to win the deal. Data/information 640 further includes individual impression based auction opportunity RTB bid requests 640, received RTB bid responses 646 and information 652 identifying determined winners of individual RTB bid request auction opportunities.

Generated individual impression based auction opportunity RTB bid requests 640 includes a plurality of RTB bid requests (RTB bid request 1 644, . . . , RTB bid request N 644). RTB bid responses 646 includes a plurality of sets of RTB bid responses (set 648 of received RTB bid requests received in response to RTB bid request 1, . . . , set 650 of received RTB bid requests received in response to RTB bid request N), each set of RTB bid responses corresponding to a RTB bid request for an individual impression based auction opportunity. Information 652 identifying determined winners of individual RTB bid request auction opportunities includes information identifying a determined winner corresponding to each bid request (information 654 identifying the winner corresponding to RTB bid request 1 654, . . . , information 656 identifying the winner corresponding to RTB bid request N). Data/information 658 further includes information 658 identifying the determined winning bidder for the deal, a downloaded media file/creative corresponding to the winner of the deal 660, and a generated signal 662 communicating impression delivery information and creative, corresponding to the winner of the deal, to a publisher device.

Figure 5:
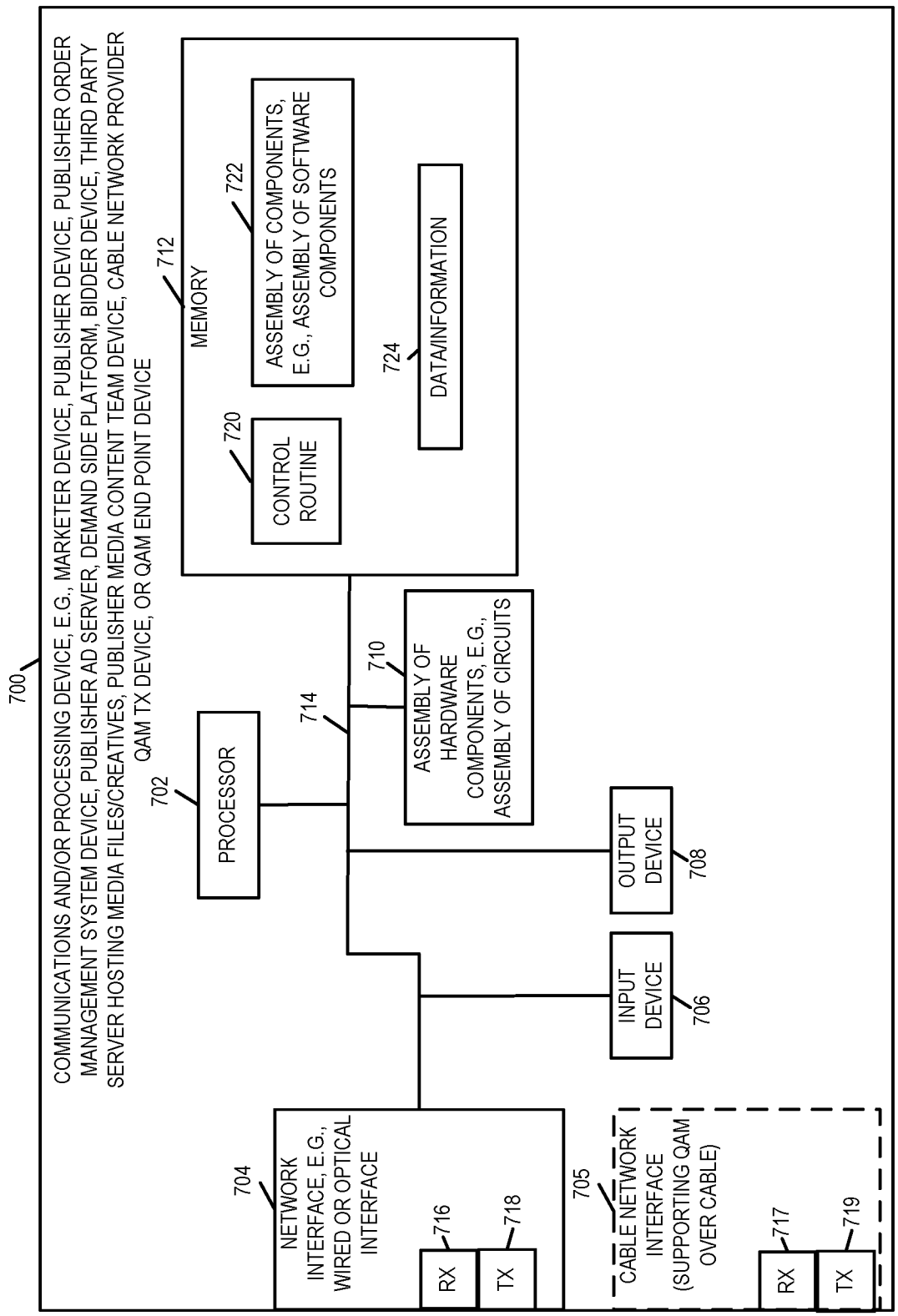
FIG. 5 is a drawing of an exemplary communications and/or processing device in accordance with an exemplary embodiment.

FIG. 5 is a drawing of an exemplary communications and/or processing device 700 in accordance with an exemplary embodiment. Exemplary communications and/or processing device 700 is any of marketer device 102, publisher device 104, publisher order management system device 106, publisher ad server 108, demand side platform (DSP) server 112 or 114, bidder device 180 or 182, third party server hosting media files/creatives 116 or 118, publisher media content team device 120, cable network provider QAM TX device 122, or QAM end point device 124 or 126 of system 100 of FIG. 2 and FIG. 3. Communications and/or processing device 700 includes a processor 702, e.g., a CPU, a network interface 704, an input device 706, e.g., a keyboard, an output device 708, e.g., a display, an assembly of hardware components 710, e.g., an assembly of circuits, and memory 712 coupled together via a bus 714 over which the various elements may interchange data and information.

Network interface 704, e.g., a wired or optical interface, includes a receiver 716 and a transmitter 718 via which the device 700 communicates with other devices. Network interface 704 couples the communications and/or processing device 700 to other network nodes, network communications links and/or the Internet.

In some embodiments, e.g., an embodiment in which device 700 is one of a cable network service provider QAM TX device or a QAM end point device, device 700 further includes cable network interface 705 supporting QAM signaling over cable. Cable network interface 705 includes a receiver 717 and a transmitter 719.

Memory 712 includes a control routine 720, an assembly of components 622, e.g., an assembly of software components, and data/information 624. Control routine 720 620 is, e.g., a routine which handles basic device functions including boot-up, memory access, interface control, etc. Assembly of components 722 includes, e.g., software, routines, sub-routines, applications, etc., which, when executed by a processor, e.g., processor 702, implement one or more steps of an exemplary method performed by device 700, e.g., steps shown and/or described with respect to a particular type of device 700, e.g. a marketer device 102, a publisher device 104, publisher order management system device 106, publisher ad server 108, demand side platform (DSP) server 112 or 114, bidder device 180 or 182, third party server hosting media files/creatives 116 or 118, publisher media content team device 120, cable network provider QAM TX device 122, or QAM end point device 124 or 126 of system 100 of FIG. 2 and/or FIG. 3.

Figure 6:
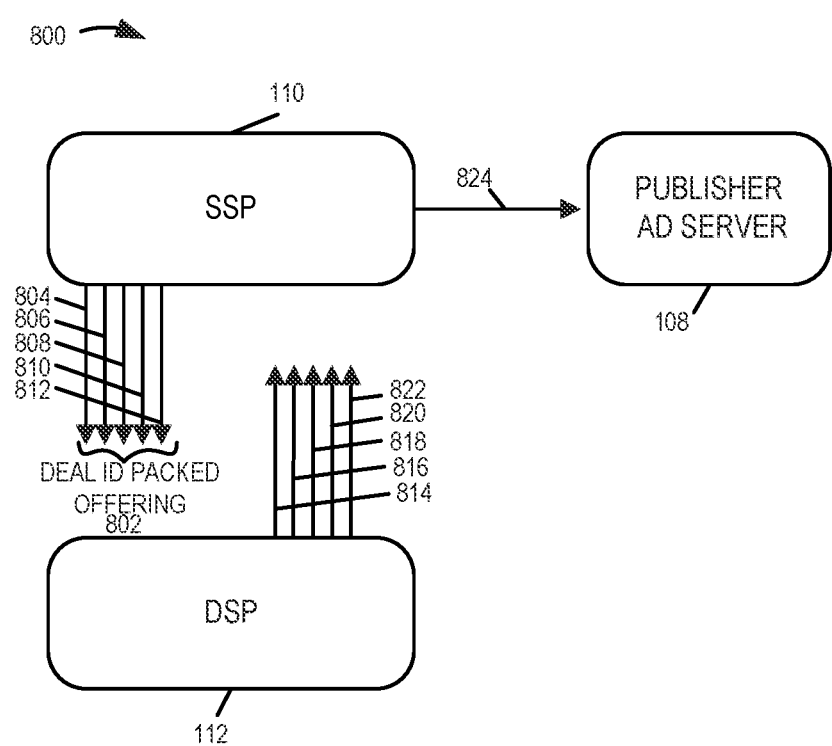
FIG. 6 is a drawing illustrating a novel methodology for independent bid auctions with multicast spot inventory in accordance with an exemplary embodiment.

FIG. 6 is a drawing 600 illustrating a novel methodology for independent bid auctions with multicast spot inventory in accordance with an exemplary embodiment. The SSP server

110 generates and sends individual impression based opportunities to a buyer in a programmatic exchange as part of a Programmatic Guaranteed deal. Deal ID packed offering 802 includes individual impression based opportunities (RTB bid request 804, RTB bid request 806, RTB bid request 808, RTB bid request 810, RTB bid request 812), which are sent from SSP server 110 to DSP server 112. The DSP server 112 produces and sends bid responses (814, 816, 818, 820, 822) for each request (804, 806, 808, 810, 812), respectively, in the deal to the SSP server 110. The approach of individual impression auction advantageously accommodates existing DSP pacing, budgeting, and reporting structures. The SSP server 110 transmits order 824 to ad server 108 for spot execution upon completion of all auctions in the Programmatic Guaranteed deal 802.

Exemplary creative specification requirements are described below.
First Party Served Video
Resolution:
16:9 Aspect Ratio
1080p (1920×1080)
Minimum Bitrate:
15 Mbps for Set-Top-Box
Video Format:
MP4 only
h264 codec
Video Frame Rate
30 fps (29.970 fps)
Video Interlacing:
Progressive scanning, non-interlaced. No intra-field motion (blended frames) or interlacing.
Audio
Audio Bitrate: 128-192 kbps
Audio Codec: AAC/MP3/MP4
Mezzanine File
Bit Rate
50 Mbps VBR or 15-30 CBR
Aspect Ratio
16:9 (HD)
No burned in pillar boxing or letterboxing
Resolution
1920×1080
Color Space
4:2:0 or 4:2:2 YUV
Frame Rate
NTSC Video (29.97 fps)
Codec
MPEG2, H.264/AAC
H.264 or Apple ProRes
Format
.mp4 or .mov
Scan type
Progressive
No intra-field motion (blended frames)
Slate
Video creative should be submitted without leaders (slate) before ad content.
Configuration
Picture to Picture (P2P)
No slate
No countdown leader
No bars
No tone
Audio Format
AAC
PCM
Audio Bitrate
192 kbps (AAC)
Audio Channel
2 channel stereo mix L&R
Audio Sample Rate
48 KHz
Audio Levels
DB—12 (average)

Various aspects and/or features of some embodiments of the present invention are further described below. A publisher and a marketer agree on deal terms for QAM impression delivery via Deal ID. The publisher enters an order, corresponding to agreed upon deal terms, into an order management system for delivery in both an Ad server and a SSP. The publisher order management system sends the order to both the publisher Ad server and the SSP. The Ad server creates a shell campaign to await the creative and impression delivery. The SSP creates a deal ID to be sent with impression opportunities as offer in the buy. The SSP sends individual impression based opportunities (bid requests) to the buyer in programmatic exchange as part of a Programmatic Guaranteed deal and receives responses (bid responses) from the DSP. The SSP determines a winner of the deal and retrieves the creative corresponding to the winning bidder. The SSP sends daily impression delivery and creative response (corresponding to the winner of the deal) to publisher for execution. Creative is verified to ensure it is up to QAM STB specification. If the creative is rejected, the creative is flagged (identifying problems) and sent back to the SSP; and the SSP engages with the DSP on reformatting or presenting a new creative that will meet the QAM STB specification. The creative, following approval, is transcoded to spec. Then, the creative is appended to the shell campaign and initiated for delivery. Then the set of QAM STB end points, which have been identified to receive the transcoded QAM ad, receive the transcoded QAM ad, and the ad is served, e.g., displayed (presented to content consumers) on display devices coupled to the QAM STB end point devices.

Linear SSP creative flow will now be described. The DSP produces bid response inclusive of link to third party hosted media file/creative. The SSP downloads media file and transmits to publisher media content team to validate that the creative specs are being satisfied. The creative transcoding ensures that the QAM spec is satisfied. Once the transcoding is completed the creative is appended to the linear campaign within the ad server and scheduled to deliver spot.

Linear media in Quadrature Amplitude Modulation (QAM) environments has seldom entered the programmatic advertising landscape on a true impression based sales model. The methodology and implementation, in accordance with the present invention, creates a workflow to programmatically auction linear ad impression based media to programmatic buyers in preconfigured blocks to unify buying and pacing across programmatic multi-screen TV buys. It then extracts the creative from the programmatic auction and inserts it into the linear media stream in an automated fashion.

The methodology and model for linear media buying will be initiated and executed via a programmatic Supply Side Platform (SSP) as the clearinghouse for auction execution. Quadrature Amplitude Modulation (QAM) linear media owners will establish programmatic guaranteed (PG) deals with designated buyers specifying negotiated CPM economic terms, audience/content targeting, flight schedule, and volume of impressions sold. The deals will be setup within the SSP platform by the media owner and the designated Demand Side Platform (DSP) platform by the media buyer respectively. The SSP platform will generate individual impression based bid requests against the PG deal at the media owner's request until the deal impression goals of the PG deal have been fulfilled. Upon reaching the daily impression goal, the SSP will issue a daily order for scheduling a linear spot with the designated impression and audience/content target in the linear owner's ad server. The SSP will also extract the creative from the DSP's ad responses and send it via API to the media owner's transcoding engine. The media owner's ad server will build a linear schedule with the transcoded creative across a dynamically selected group of spots that are forecasted to generate an impression volume correlating to the daily impression target of the PG deal. Post-delivery ad exposure reporting will validate the PG deal impression goals were achieved, and any under-delivery will be credited against the following day's order to ensure full delivery is achieved against the overall deal impression goal.

While various exemplary embodiments are described in the context of a set top box which is coupled to a device which is a display or includes a display for displaying programs and creatives, e.g., ads, delivered in accordance with the invention the method can also be used to supply content to a device with an integrated display such as a smart TV or other device which is capable of receiving content via multicast and/or QAM delivery via, e.g., a communications channel such as a switched digital video channel. Whether the display is integrated into the device or is a separate device from the one which receives the content, images of the delivered content can and are displayed to a user in accordance with the described exemplary method.

Numbered List of Exemplary Method Embodiments

Method Embodiment 1. A content delivery method, the method comprising: communicating (238) a first (240) individual impression based auction opportunity corresponding to a first deal from a supply side platform (SSP) server to one or more demand side platform (DSP) servers (112, 114), said first deal involving delivery of content (e.g., a first creative in the form of an ad) to a plurality of end point devices (e.g., via a QAM or multicast delivery method), said first deal being a content delivery deal, said content delivery deal being for a number of N impressions (e.g., where an individual impression corresponds to display of content, e.g., an ad, on an individual end point device), where N is a number greater than 1; updating (270) a first deal win counter corresponding to the winner of the first individual impression based auction opportunity of the first deal, the first deal win counter being one of a plurality of first deal win counters, each of the first deal win counters corresponding to a different bidder: communicating (274), a second individual impression based auction opportunity corresponding to the first deal to the one or more DSP servers (112, 114): updating (320) a first deal win counter corresponding to a winner of the second individual impression based auction opportunity (said first deal win counter corresponding to the second winner of the second individual impression based auction opportunity being the same counter which was updated in response to the first individual deal impression opportunity when the winner of the second individual impression based auction opportunity is the same as the winner of the first individual impression based auction opportunity and being a different counter when the winner of the second individual impression based auction opportunity is a different winner (e.g., different bidder than the winner of the first individual impression based auction opportunity)); and identifying (e.g., declaring a deal winner) (506), a winner of the first deal in response to determining (504) one of the first deal win counters in said plurality of first deal win counters reached the number N, the identified winner of the first deal being the bidder corresponding to the first deal win counter which reached the number N (e.g., bidder 1 is declared winner in response to determining that bidder 1 won 5 individual impression based auction opportunities corresponding to the first deal when in the example N=5).

Method Embodiment 1AA. The method of Method Embodiment 1, further comprising: initiating (508) delivery (e.g., by sending a request to download the creative to be delivered on behalf of the winner) of a creative (e.g., ad) identified or supplied by the winning bidder to multiple (e.g., N) end point devices (set top boxes or TVs) via a QAM content delivery channel in response to identification of the winner of the first deal.

Method Embodiment 1A1. The method of Method Embodiment 1AA, further comprising: downloading (518) the creative (e.g., from a third part server (116) hosting creative on behalf of the winning bidder of the deal); and sending (520) the downloaded creative to a publisher device (120) (for specification verification in accordance with bid request requirements, subsequent QAM transcoding, and subsequent delivery to an ad server (108) where the approved transcoded creative will be appended to a campaign shell).

Method Embodiment 1AB. The method of Method Embodiment 1AA, further comprising: receiving (266) one or more bid responses in response to the first individual impression based auction opportunity: determining (268), based on the one or more bid responses received in response to the first individual impression based auction opportunity, the winner of the first individual impression based auction opportunity of the first deal.

Method Embodiment 1B. The method of Method Embodiment 1AB, further comprising: determining (318), based on the one or more bid responses received in response to the second individual impression based auction opportunity, the winner of the second individual impression based auction opportunity of the first deal.

Method Embodiment 1C. The method of Method Embodiment 1B, further comprising: checking (272, 322, 358, 394, 430, 466, 502) the first deal win counters after each win determination to determine when a first deal win counter in said plurality of first deal win counters reaches a number matching the number N of impressions included in the first deal, the first deal win counter to reach the number N being a winner of the first deal.

Method Embodiment 2. The method of Method Embodiment 1C, further comprising: generating (234), at the SSP server, a first deal ID for a first content delivery deal; and wherein the first deal ID is included in the first (240) individual impression based auction opportunity and the second individual impression based auction opportunity.

Method Embodiment 3. The method of Method Embodiment 2, wherein the first deal ID is further included in responses to the first (240) individual impression based auction opportunity and in responses to the second individual impression based auction opportunity.

Method Embodiment 4. The method of Method Embodiment 3, wherein individual responses from different bidders to the first individual impression based auction opportunity include the first deal ID and an ID of the bidder to which a response to the first individual impression based auction opportunity corresponds.

Method Embodiment 5. The method of Method Embodiment 4, wherein updating (270) a first deal win counter in response to determining a winner of the first individual impression based auction opportunity includes updating a first deal win counter corresponding to both the first deal ID and the ID of the bidder having been determined to be the winner of the first individual impression based auction opportunity.

Method Embodiment 6. The method of Method Embodiment 5, wherein individual responses from different bidders to the second individual impression based auction opportunity include the first deal ID and an ID of the bidder to which a response the second individual impression based auction opportunity corresponds.

Method Embodiment 7. The method of Method Embodiment 5, wherein updating (320) a first deal win counter corresponding to the winner of the second individual impression based auction opportunity includes updating a first deal win counter corresponding to both the first deal ID and the ID of the bidder having been determined to be the winner of the second individual impression based auction opportunity.

Method Embodiment 8. The method of Method Embodiment 2, where initiating (508) delivery of a creative (e.g., ad) identified or supplied by the winning bidder to multiple (e.g., N) end point devices (set top boxes or TVs) via a QAM content delivery channel is not performed until a single individual bidder wins N individual impression based auction opportunities.

Method Embodiment 9. The method of Method Embodiment 8, further comprising: notifying (507) the winner bidder of winning the first deal; and updating (580) accounting information indicating that the winner bidder is responsible for paying the N individual bid amounts that were bid by the winning bidder in the N individual impression based auction opportunities corresponding to the first deal that were won by the winning bidder (note that different amounts may have been bid for different ones of the N winning bids).

Method Embodiment 10. The method of Method Embodiment 2, wherein the first (240) individual impression based auction opportunity is for a single impression and does not include a multiplier value, said deal being for N impressions delivered via a single QAM content delivery to N different devices (e.g., STBs).

Method Embodiment 11. The method of Method Embodiment 1, wherein the end point devices include a set top box coupled to a display.

Method Embodiment 12. The method of Method Embodiment 1, wherein the end point devices include a playback device which includes a display (e.g., a smart TV).

Method Embodiment 13. The method of Method Embodiment 1, wherein the end point devices include a set top box coupled to a display and a playback device which includes a display.

Numbered List of Exemplary Apparatus Embodiments

Apparatus Embodiment 1. A supply side platform (SSP) server (110 or 600) comprising: a transmitter (618): a receiver (616); and a processor (602) configured to: operate the SSP server to communicate (238) (via transmitter 618) a first (240) individual impression based auction opportunity corresponding to a first deal to one or more DSP servers (112, 114), said first deal involving delivery of content (e.g., a first creative in the form of an ad) to a plurality of end point devices (e.g., via a QAM and/or multicast content delivery method), said first deal being a content delivery deal, said content delivery deal being for a number of N impressions (e.g., where an individual impression corresponds to display of content, e.g., an ad, on an individual end point device), where N is a number greater than 1: determine (268), based on the one or more bid responses received in response to the first individual impression based auction opportunity, a winner of the first individual impression based auction opportunity of the first deal: update (270) a first deal win counter corresponding to the winner of the first deal, the first deal win counter being one of a plurality of first deal win counters, each of the first deal win counters corresponding to a different bidder; operate the SSP to communicate (274), (via transmitter 618) a second individual impression based auction opportunity corresponding to the first deal to the one or more DSP servers (112, 114); update (320) a first deal win counter corresponding to the winner of the second individual impression based auction opportunity (said first deal win counter corresponding to the second winner of the second individual impression based auction opportunity being the same counter which was updated in response to the first individual deal impression opportunity when the winner of the second individual impression based auction opportunity is the same as the winner of the first individual impression based auction opportunity and being a different counter when the winner of the second individual impression based auction opportunity is a different winner (e.g., different bidder than the winner of the first individual impression based auction opportunity)); and identify (e.g., declaring a deal winner) (506), in response to said checking determining (504) one of the first deal win counters in said plurality of first deal win counters reached the number N, a winner of the first deal, the winner of the first deal being the bidder corresponding to the first deal win counter which reached the number N (e.g., bidder 1 is declared winner in response to determining that bidder 1 won 5 individual impression based auction opportunities corresponding to the first deal when in the example N=5).

Apparatus Embodiment 1AA. The SSP server (110 or 600) of Apparatus Embodiment 1, wherein said processor (602) is further configured to: operate the SSP server to initiate (508) delivery (e.g., by sending a request to download the creative to be delivered on behalf of the winner) of a creative (e.g., ad) identified or supplied by the winning bidder to multiple (e.g., N) end point devices (set top boxes or TVs) via a QAM content delivery channel in response to identification of the winner of the first deal.

Apparatus Embodiment 1AAA. The SSP server (110 or 600) of Apparatus Embodiment 1, wherein said processor (602) is further configured to: download (518) (via receiver 616) the creative (e.g., from a third part server (116) hosting creative on behalf of the winning bidder of the deal); and operate the SSP to send (520) (via transmitter 618) the downloading creative to a publisher device (120) (for specification verification in accordance with bid request requirements, subsequent QAM transcoding, and subsequent delivery to an ad server (108) where the approved transcoded creative will be appended to a campaign shell).

Apparatus Embodiment 1AB. The SSP server (110 or 600) of Apparatus Embodiment 1AA, wherein said processor (602) is further configured to: operate the SSP to receive (266) (via receiver 616) one or more bid responses in response to the first individual impression based auction opportunity.

Apparatus Embodiment 1B. The SSP server (110 or 600) of Apparatus Embodiment 1AB, wherein said processor (602) is further configured to: determine (318), based on the one or more bid responses received in response to the second individual impression based auction opportunity, a winner of the second individual impression based auction opportunity of the first deal:

Apparatus Embodiment 1C. The SSP server (110 or 600) of Apparatus Embodiment 1B, wherein said processor (602) is further configured to: check (272, 322, 358, 394, 430, 466, 502) the first deal win counters after each win determination to determine when a first deal win counter in said plurality of first deal win counters reaches a number matching the number N of impressions included in the first deal, the first deal win counter to reach the number N being a winner of the first deal.

Apparatus Embodiment 2. The SSP server (110 or 600) of Apparatus Embodiment 1C, wherein said processor (602) is further configured to: generate (234), at the SSP server, a first deal ID for a first content delivery deal; and wherein the first deal ID is included in the first (240) individual impression based auction opportunity and the second individual impression based auction opportunity.

Apparatus Embodiment 3. The SSP server (110 or 600) of Apparatus Embodiment 2, wherein the first deal ID is further included in responses to the first (240) individual impression based auction opportunity and in responses to the second individual impression based auction opportunity.

Apparatus Embodiment 4. The SSP server (110 or 600) of Apparatus Embodiment 3, wherein individual responses from different bidders to the first individual impression based auction opportunity include the first deal ID and an ID of the bidder to which a response to the first individual impression based auction opportunity corresponds.

Apparatus Embodiment 5. The SSP server (110 or 600) of Apparatus Embodiment 4, wherein said processor (602) is configured to:
update a first deal win counter corresponding to both the first deal ID and the ID of the bidder having been determined to be the winner of the first individual impression based auction opportunity, as part of being configured to update (270) a first deal win counter in response to determining a winner of the first individual impression based auction opportunity.

Apparatus Embodiment 6. The SSP server (110 or 600) of Apparatus Embodiment 5, wherein individual responses from different bidders to the second individual impression based auction opportunity include the first deal ID and an ID of the bidder to which a response the second individual impression based auction opportunity corresponds.

Apparatus Embodiment 7. The SSP server (110 or 600) of Apparatus Embodiment 5, wherein said processor (602) is configured to: update a first deal win counter corresponding to both the first deal ID and the ID of the bidder having been determined to be the winner of the second individual impression based auction opportunity, as part of being configured to update (320) a first deal win counter corresponding to the winner of the second individual impression based auction opportunity.

Apparatus Embodiment 8. The SSP server (110 or 600) of Apparatus Embodiment 2, where initiating (508) delivery of a creative (e.g., ad) identified or supplied by the winning bidder to multiple (e.g., N) end point devices (set top boxes or TVs) via a QAM content delivery channel is not performed until a single individual bidder wins N individual impression based auction opportunities.

Apparatus Embodiment 9. The SSP server (110 or 600) of Apparatus Embodiment 8, wherein said processor (602) is further configured to: operate the SSP server to notify (507) the winner bidder of winning the first deal; and operate the SSP to update (580) accounting information indicating that the winner bidder is responsible for paying the N individual bid amounts that were bid by the winning bidder in the N individual impression based auction opportunities corresponding to the first deal that were won by the winning bidder (note that different amounts may have been bid for different ones of the N winning bids).

Apparatus Embodiment 10. The SSP server (110 or 600) of Apparatus Embodiment 2, wherein the first (240) individual impression based auction opportunity is for a single impression and does not include a multiplier value, said deal being for N impressions delivered via a single QAM content delivery to N different devices (e.g., STBs).

Numbered List of Exemplary Non-Transitory Computer Readable Medium Embodiments

Non-Transitory Computer Readable Medium Embodiment 1. A non-transitory computer readable medium (612) including machine executable instructions which when executed by a processor (602) of a supply side platform (SSP) server (110 or 600) cause the SSP server (110 or 600) to perform the steps of: communicating (238) a first (240) individual impression based auction opportunity corresponding to a first deal to one or more demand side platform (DSP) servers (112, 114), said first deal involving delivery of content (e.g., a first creative in the form of an ad) to a plurality of end point devices (e.g., via a QAM and/or multicast content delivery method), said first deal being a content delivery deal, said content delivery deal being for a number of N impressions (e.g., where an individual impression corresponds to display of content, e.g., an ad, on an individual end point device), where N is a number greater than 1: determining (268), based on the one or more bid responses received in response to the first individual impression based auction opportunity, a winner of the first individual impression based auction opportunity of the first deal: updating (270) a first deal win counter corresponding to the winner of the first individual impression based auction opportunity of the first deal, the first deal win counter being one of a plurality of first deal win counters, each of the first deal win counters corresponding to a different bidder: communicating (274), a second individual impression based auction opportunity corresponding to the first deal to the one or more DSP servers (112, 114); determining (318), based on the one or more bid responses received in response to the second individual impression based auction opportunity, a winner of the second individual impression based auction opportunity of the first deal: updating (320) a first deal win counter corresponding to the winner of the second individual impression based auction opportunity (said first deal win counter corresponding to the second winner of the second individual impression based auction opportunity being the same counter which was updated in response to the first individual deal impression opportunity when the winner of the second individual impression based auction opportunity is the same as the winner of the first individual impression based auction opportunity and being a different counter when the winner of the second individual impression based auction opportunity is a different winner (e.g., different bidder than the winner of the first individual impression based auction opportunity)); and identifying (e.g., declaring a deal winner) (506), in response to said checking determining (504) one of the first deal win counters in said plurality of first deal win counters reached the number N, a winner of the first deal, the winner of the first deal being the bidder corresponding to the first deal win counter which reached the number N (e.g., bidder 1 is declared winner in response to determining that bidder 1 won 5 individual impression based auction opportunities corresponding to the first deal when in the example N=5).

Non-Transitory Computer Readable Medium Embodiment 1AA. The non-transitory computer readable medium (612) of Non-Transitory Computer Readable Medium Embodiment 1, further including machine executable instructions which when executed by the processor (602) of the supply side platform (SSP) server (110 or 600) cause the SSP server (110 or 600) to perform the step of: initiating (508) delivery (e.g., by sending a request to download the creative to be delivered on behalf of the winner) of a creative (e.g., ad) identified or supplied by the winning bidder to multiple (e.g., N) end point devices (set top boxes or TVs) via a QAM content delivery channel in response to identification of the winner of the first deal.

Non-Transitory Computer Readable Medium Embodiment 1AAA. The non-transitory computer readable medium (612) of Non-Transitory Computer Readable Medium Embodiment 1AA, further including machine executable instructions which when executed by the processor (602) of the supply side platform (SSP) server (110 or 600) cause the SSP server (110 or 600) to perform the step of: downloading (518) the creative (e.g., from a third part server (116) hosting creative on behalf of the winning bidder of the deal); and sending (520) the downloaded creative to a publisher device (120) (for specification verification in accordance with bid request requirements, subsequent QAM transcoding, and subsequent delivery to an ad server (108) where the approved transcoded creative will be appended to a campaign shell).

Non-Transitory Computer Readable Medium Embodiment 1AB. The non-transitory computer readable medium (612) of Non-Transitory Computer Readable Medium Embodiment 1AA, further including machine executable instructions which when executed by the processor (602) of the supply side platform (SSP) server (110 or 600) cause the SSP server (110 or 600) to perform the step of: receiving (266) one or more bid responses in response to the first individual impression based auction opportunity.

Non-Transitory Computer Readable Medium Embodiment 1B. The non-transitory computer readable medium (612) of Non-Transitory Computer Readable Medium Embodiment 1AB, further including machine executable instructions which when executed by the processor (602) of the supply side platform (SSP) server (110 or 600) cause the SSP server (110 or 600) to perform the step of: determining (318), based on the one or more bid responses received in response to the second individual impression based auction opportunity, a winner of the second individual impression based auction opportunity of the first deal.

Non-Transitory Computer Readable Medium Embodiment 1C. The non-transitory computer readable medium (612) of Non-Transitory Computer Readable Medium Embodiment 1B, further including machine executable instructions which when executed by the processor (602) of the supply side platform (SSP) server (110 or 600) cause the SSP server (110 or 600) to perform the step of: checking (272, 322, 358, 394, 430, 466, 502) the first deal win counters after each win determination to determine when a first deal win counter in said plurality of first deal win counters reaches a number matching the number N of impressions included in the first deal, the first deal win counter to reach the number N being a winner of the first deal.

Numerous variations on the above described embodiments are possible.

While a logical sequencing of the processing steps of the exemplary embodiments of the methods, routines and subroutines of the present invention have been shown, the sequencing is only exemplary, and the ordering of the steps may be varied.

The techniques of various embodiments may be implemented using software, hardware and/or a combination of software and hardware. Various embodiments are directed to apparatus, e.g., a media content distribution system. Various embodiments are also directed to methods, e.g., a method of controlling the distribution of media content, e.g., video on demand audio and/or video content. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method. In some embodiments devices, elements and/or modules that are configured to perform various functions are implemented as circuits, e.g., with a different circuit for each function being implemented in some but not necessarily all embodiments.

Various features of the present invention are implemented using modules. For example, each of the various routines and/or subroutines disclosed may be implemented in one or more modules. Such modules may be, and in some embodiments are, implemented as software modules. In other embodiments the modules are implemented in hardware, e.g., in circuitry, ASICs, ICs, etc. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a non-transitory machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A content delivery method, the method comprising:
communicating a first individual impression based auction opportunity corresponding to a first deal from a supply side platform (SSP) server to one or more demand side platform (DSP) servers, said first deal involving delivery of content to a plurality of end point devices, said first deal being a content delivery deal, said content delivery deal being for a number of N impressions, where N is a number greater than 1;
updating a first deal win counter corresponding to the winner of the first individual impression based auction opportunity of the first deal, the first deal win counter being one of a plurality of first deal win counters, each of the first deal win counters corresponding to a different bidder;
communicating a second individual impression based auction opportunity corresponding to the first deal to the one or more DSP servers;
updating a first deal win counter corresponding to a winner of the second individual impression based auction opportunity; and
identifying a winner of the first deal in response to determining one of the first deal win counters in said plurality of first deal win counters reached the number N, the identified winner of the first deal being the bidder corresponding to the first deal win counter which reached the number N.

2. The method of claim 1, further comprising:
initiating delivery of a creative identified or supplied by the winning bidder to multiple end point devices via a QAM content delivery channel in response to identification of the winner of the first deal.

3. The method of claim 2, further comprising:
receiving one or more bid responses in response to the first individual impression based auction opportunity; and
determining, based on the one or more bid responses received in response to the first individual impression based auction opportunity, the winner of the first individual impression based auction opportunity of the first deal.

4. The method of claim 3, further comprising:
determining, based on the one or more bid responses received in response to the second individual impression based auction opportunity, the winner of the second individual impression based auction opportunity of the first deal.

5. The method of claim 4, further comprising:
checking the first deal win counters after each win determination to determine when a first deal win counter in said plurality of first deal win counters reaches a number matching the number N of impressions included in the first deal, the first deal win counter to reach the number N being a winner of the first deal.

6. The method of claim 5, further comprising:
generating, at the SSP server, a first deal ID for a first content delivery deal; and
wherein the first deal ID is included in the first individual impression based auction opportunity and the second individual impression based auction opportunity.

7. The method of claim 6, wherein the first deal ID is further included in responses to the first individual impression based auction opportunity and in responses to the second individual impression based auction opportunity.

8. The method of claim 7, wherein individual responses from different bidders to the first individual impression based auction opportunity include the first deal ID and an ID of the bidder to which a response to the first individual impression based auction opportunity corresponds; and
wherein updating a first deal win counter in response to determining a winner of the first individual impression based auction opportunity includes updating a first deal win counter corresponding to both the first deal ID and the ID of the bidder having been determined to be the winner of the first individual impression based auction opportunity.

9. The method of claim 6, where initiating delivery of a creative identified or supplied by the winning bidder to multiple end point devices via a QAM content delivery channel is not performed until a single individual bidder wins N individual impression based auction opportunities; and
wherein the method further comprises:
notifying the winning bidder of winning the first deal; and
updating accounting information indicating that the winning bidder is responsible for paying the N individual bid amounts that were bid by the winning bidder in the N individual impression based auction opportunities corresponding to the first deal that were won by the winning bidder, where different amounts may have been bid for different ones of the N winning bids.

10. The method of claim 6, wherein the first individual impression based auction opportunity is for a single impression and does not include a multiplier value, said deal being for N impressions delivered via a single QAM content delivery to N different devices.

11. A supply side platform (SSP) server comprising:
a transmitter;
a receiver; and
a processor configured to:
operate the SSP server to communicate a first individual impression based auction opportunity corresponding to a first deal to one or more demand side platform (DSP) servers, said first deal involving delivery of content to a plurality of end point devices, said first deal being a content delivery deal, said content delivery deal being for a number of N impressions, where N is a number greater than 1;
determine, based on one or more bid responses received in response to the first individual impression based auction opportunity, a winner of the first individual impression based auction opportunity of the first deal;

update a first deal win counter corresponding to the winner of the first deal, the first deal win counter being one of a plurality of first deal win counters, each of the first deal win counters corresponding to a different bidder;

operate the SSP to communicate a second individual impression based auction opportunity corresponding to the first deal to the one or more DSP servers;

update a first deal win counter corresponding to the winner of the second individual impression based auction opportunity; and identify, in response to checking determining one of the first deal win counters in said plurality of first deal win counters reached the number N, a winner of the first deal, the winner of the first deal being the bidder corresponding to the first deal win counter which reached the number N.

12. The SSP server of claim 11, wherein said processor is further configured to: operate the SSP server to initiate delivery of a creative identified or supplied by the winning bidder to multiple end point devices via a QAM content delivery channel in response to identification of the winner of the first deal.

13. The SSP server of claim 12, wherein said processor is further configured to:

operate the SSP server to receive one or more bid responses in response to the first individual impression based auction opportunity.

14. The SSP server of claim 13, wherein said processor is further configured to: determine, based on the one or more bid responses received in response to the second individual impression based auction opportunity, a winner of the second individual impression based auction opportunity of the first deal.

15. The SSP server of claim 14, wherein said processor is further configured to: check the first deal win counters after each win determination to determine when a first deal win counter in said plurality of first deal win counters reaches a number matching the number N of impressions included in the first deal, the first deal win counter to reach the number N being a winner of the first deal.

16. The SSP server of claim 15, wherein said processor is further configured to:

generate a first deal ID for a first content delivery deal; and wherein the first deal ID is included in the first individual impression based auction opportunity and the second individual impression based auction opportunity.

17. The SSP server of claim 16, wherein the first deal ID is further included in responses to the first individual impression based auction opportunity and in responses to the second individual impression based auction opportunity.

18. The SSP server of claim 17, wherein individual responses from different bidders to the first individual impression based auction opportunity include the first deal ID and an ID of the bidder to which a response to the first individual impression based auction opportunity corresponds; and wherein said processor is configured to:

update a first deal win counter corresponding to both the first deal ID and the ID of the bidder having been determined to be the winner of the first individual impression based auction opportunity, as part of being configured to update a first deal win counter in response to determining a winner of the first individual impression based auction opportunity.

19. The SSP server of claim 16, where initiating delivery of a creative identified or supplied by the winning bidder to multiple end point devices via a QAM content delivery channel is not performed until a single individual bidder wins N individual impression based auction opportunities; and wherein said processor is further configured to:

operate the SSP server to notify the winning bidder of winning the first deal; and operate the SSP server to update accounting information indicating that the winning bidder is responsible for paying the N individual bid amounts that were bid by the winning bidder in the N individual impression based auction opportunities corresponding to the first deal that were won by the winning bidder.

20. A non-transitory computer readable medium including machine executable instructions which when executed by a processor of a supply side platform (SSP) server cause the SSP server to perform the steps of:

communicating a first individual impression based auction opportunity corresponding to a first deal to one or more demand side platform (DSP) servers, said first deal involving delivery of content to a plurality of end point devices, said first deal being a content delivery deal, said content delivery deal being for a number of N impressions, where N is a number greater than 1;

determining, based on the one or more bid responses received in response to the first individual impression based auction opportunity, a winner of the first individual impression based auction opportunity of the first deal;

updating a first deal win counter corresponding to the winner of the first individual impression based auction opportunity of the first deal, the first deal win counter being one of a plurality of first deal win counters, each of the first deal win counters corresponding to a different bidder;

communicating, a second individual impression based auction opportunity corresponding to the first deal to the one or more DSP servers;

determining, based on the one or more bid responses received in response to the second individual impression based auction opportunity, a winner of the second individual impression based auction opportunity of the first deal;

updating a first deal win counter corresponding to the winner of the second individual impression based auction opportunity; and identifying, in response to checking determining one of the first deal win counters in said plurality of first deal win counters reached the number N, a winner of the first deal, the winner of the first deal being the bidder corresponding to the first deal win counter which reached the number N.

* * * * *